United States Patent [19]

Moroto et al.

[11] Patent Number: 4,943,925
[45] Date of Patent: Jul. 24, 1990

[54] NAVIGATION APPARATUS BASED ON PRESENT POSITION CALCULATING SYSTEM

[75] Inventors: Shuzo Moroto; Koji Sumiya; Shouji Yokoyama; Mitsuhiro Nimura; Akimasa Nanba, all of Anjo, Japan

[73] Assignee: Aisin AW Co., Ltd., Anjo, Japan

[21] Appl. No.: 260,213

[22] Filed: Oct. 20, 1988

[30] Foreign Application Priority Data

Oct. 30, 1987 [JP] Japan .................................. 62-275095
Aug. 11, 1988 [JP] Japan .................................. 63-202474

[51] Int. Cl.⁵ ............................................ G06F 15/50
[52] U.S. Cl. ..................................... 364/449; 364/444; 340/988; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,688,176 | 8/1987 | Hirata | 364/449 |
| 4,774,671 | 9/1988 | Itoh et al. | 340/995 |
| 4,774,672 | 9/1988 | Tsunoda et al. | 364/449 |
| 4,792,907 | 12/1988 | Ikeda et al. | 73/178 R |
| 4,796,189 | 1/1989 | Nakayama et al. | 73/178 R |
| 4,812,845 | 3/1989 | Yamada | 364/449 |
| 4,814,989 | 3/1989 | Döbereiner et al. | 73/178 R |

Primary Examiner—Gary Chin
Attorney, Agent, or Firm—Varndell Legal Group

[57] ABSTRACT

A navigation apparatus having road system data 6 which represents information of connections and coordinates of intersections and roads between intersections, a travel distance sensor 2, steering angle sensor 3, a present position calculating module 4 for calculating the present position with a unit distance between an intersection and the terminal intersection of a going-out road selected at the former intersection. The apparatus is further provided with a module 15 for generating data on the direction of traveling to a destination point at respective intersections, and a guidance outputting module 5. Traveling direction data is made in response to inputting of the destination point, the present position is determined by selecting a going-out road with the present position calculating module with respect to each intersection, and guidance data on the traveling direction at the terminal intersection of the present road is thereafter output. When a present position is input, the present position is calculated from data on the corresponding road, the travel distance, and the steering angle. Similarly, at the terminal intersection of this road, another road extending in the traveling direction is selected from the road system data. The present position is also calculated with respect to this road.

11 Claims, 36 Drawing Sheets

FIG. 3(b)

INTERSECTION DATA

| INTER-SECTION NO. | LEADING-OUT ROAD | LEADING-IN ROAD | (EAST LONGI-TUDE, NORTH LATITUDE) | INTERSECTION NAMES |
|---|---|---|---|---|
| I | ② | ① | (50, 150) | FRONT OF MINAMI ANJYO STATION |
| II | ① | ② | (10, 100) | MINAMI ANJYO STATION |
| III | ⑥ | ⑤ | (150, 150) | ASAHI-CHO |
| IV | ④ | ③ | (100, 100) | AIOI-CHO |
| V | ⑦ | ⑧ | (50, 50) | MINAMI-CHO |
| VI | ⑬ | ⑭ | (10, 10) | |
| VII | ⑩ | ⑨ | (150, 20) | |

FIG. 3(c)

ROAD DATA

| ROAD NO. | NEXT ROAD NUMBER WITH SAME START-ING POINT | NEXT ROAD NUMBER WITH SAME TER-MINAL POINT | STARTING POINT | TERMINAL POINT | NODE SERIES POINTER | LENGTH OF ROAD |
|---|---|---|---|---|---|---|
| ① | ⑪ | ④ | II | I | A000 | 1000 |
| ② | ③ | ⑫ | I | II | A0A0 | 1000 |
| ③ | ② | ⑥ | I | IV | A0B3 | 2000 |
| ④ | ⑤ | ① | IV | I | A0C0 | 2000 |
| ⑤ | ⑧ | ⑤ | IV | III | A0DE | 1500 |
| ⑥ | ⑥ | ⑦ | III | IV | A101 | 1500 |
| ⑦ | ⑫ | ⑩ | V | IV | A201 | 800 |
| ⑧ | ⑨ | ⑪ | IV | V | A221 | 800 |
| ⑨ | ④ | ⑨ | IV | VII | A253 | |
| ⑩ | ⑩ | ③ | VII | IV | A260 | |
| ⑪ | ① | ⑬ | I | V | A265 | |
| ⑫ | ⑭ | ② | V | II | A28B | |
| ⑬ | ⑬ | ⑧ | VI | V | A2A0 | |
| ⑭ | ⑦ | ⑭ | V | VI | A2B0 | |

FIG.3(d)

NODE SERIES
DATA

A000 | 15 | ← NUMBER OF NODES
| (10,100) | (EAST LONGITUDE
| (20,110) | NORTH LATITUDE)
| (30,130) |
| ⋮ |

A0A0 | 20 |
| (50,150) |
| (40,130) |
| ⋮ |

DESTINATION INPUT

| 0 0 0 1 |

| 0 | 1 | 2 | 3 |
| 4 | 5 | 6 | 7 |
| 8 | 9 |

OK    CANCEL

GUIDANCE OUTPUT

TRAVELING DIRECTION DATA

| INTERSECTION NO. | ROAD TO BE SELECTED |
|---|---|
| I | ∅ |
| II | ① |
| III | ⑥ |
| IV | ④ |
| V | ⑫ |
| VI | ⑬ |
| VII | ⑩ |

| ROAD NUMBER | ⑫ |
|---|---|
| TERMINAL INTERSECTION NUMBER | II |
| REMAINING DISTANCE | 500 |

STEERING ANGLE
Sta(i)

| | |
|---|---|
| 0 | −4 |
| 1 | 3 |
| 2 | 0 |
| ⋮ | ⋮ |
| 6 | 5 |
| 7 | 4 |

VEHICLE ORIENTATION
Ang(i)

| | |
|---|---|
| 0 | −10 |
| 1 | 10 |
| 2 | 0 |
| ⋮ | ⋮ |
| 6 | 60 |
| 7 | 50 |

VEHICLE LOCUS
(X(i), Y(i))

| | |
|---|---|
| 0 | (100, 100) |
| 1 | (99, 105) |
| ⋮ | ⋮ |
| 6 | (150, 120) |
| 7 | (155, 125) |

INTERSECTION ERROR RANGE

GOING-OUT ROAD

CURVING ANGLE FROM DATA

COMING-IN ROAD

VEHICLE LOCUS

DETECTED CURVING ANGLE

ORIENTATION AT CURVING STARTING POINT $\widehat{AB} = D_{up}$ $\widehat{BC} = D_{down}$

NAVIGATION APPARATUS BASED ON PRESENT POSITION CALCULATING SYSTEM

BACKGROUND OF THE INVENTION

This invention relates to a navigation apparatus for guiding a driver to his destination by selecting a course leading to the place input as the destination while calculating the present position at every intersection along the way to the destination.

Navigation apparatus are known as an apparatus used to guide a driver who is a stranger in a certain region to his destination in this region by selecting a suitable course leading thereto. Apparatus of this kind are now developed eagerly.

In a conventional navigation apparatus, a course along which a driver will be led to his destination is set on the basis of a starting point and a destination point input before the driver starts traveling. The driver navigates along the course thereby set. There are various methods for designating the course during navigation. In one such method the course is displayed on a CRT screen while being superposed on a map displayed on the same screen. In another, numerals or graph indicating a distance to an intersection at which the driver should turn the vehicle and pictures showing features of the intersection are displayed as information on this intersection. In a further method, a voice output is utilized as auxiliary means.

Conventional navigation apparatus, however, are designed to set a course from a starting point to a destination point and guide the driver along the course thereby set. If the driver fails to keep the vehicle on the desired course by making an error in identifying an intersection, he cannot continue traveling in accordance with the guidance effected by the navigation apparatus, unless he returns the vehicle to the course previously set or sets a new course by inputting the present position as a starting point. In this event, it is very troublesome for the driver to return to the course previously set as well as to set the present position as a starting point to determine a new course. That is, needless to say, the driver is unfamiliar with road circumstances of the particular region in which he is lost and, for this reason, he needs guidance. It is therefore difficult for him even to know his present position, although he knows the starting and destination points.

Whether or not the vehicle has passed over the desired intersection by traveling along the guidance course is determined by the distance through which the vehicle has traveled and the turning of the vehicle to the left or right which are detected by a distance sensor and a steering sensor. In practice, there is a problem of accumulation of errors in the detection which may cause an error in driver's decision. That is, since the distance through which the vehicle has traveled and turning to he left and right are detected on the basis of the setting of a course from the starting point to the destination point, distance errors are accumulated to an extent such that they cannot be corrected.

SUMMARY OF THE INVENTION

The present invention is directed to solving theses problems and an object of the present invention is to enable the driver to be guided at any intersection to a suitable road leading to his destination without fixing the course of travel.

Another object of the present invention is to enable the outputting of guidance information for navigation to a destination point, even if an undesignated road is selected at an intersection.

Still another object of the present invention is to enable recognition of the present position at every intersection.

A further object of the present invention is to enable distance correction at an intersection.

A still further object of the present invention is to enable simplification of data structure as well as to enable guidance based on course selection which is optimized while providing flexibility with respect to the state of vehicle running.

Still other objects and advantages of the invention will in part be obvious and will in part be apparent from the specification.

The invention accordingly comprises the features of construction, combinations of elements, and arrangements of parts which will be exemplified in the construction hereinafter set forth, and the scope of the invention will be indicated in the claims.

To these ends, the present invention provides a navigation apparatus based on a present position calculating system having: road system data which represents information on connections and coordinates of intersections and roads between intersections; a means for detecting the distance through which the vehicle has traveled; a means for detecting the steering angle; and a means for calculating the present position from the travel distance, the steering angle and the road system data, wherein the present position at an intermediate intersection is calculated by obtaining, based on a unit distance between an intermediate intersection and the terminal intersection of a road selected at the intermediate intersection, the remaining distance to the terminal intersection from the length of the selected road and the distance through which the vehicle has traveled and by obtaining the orientation and the coordinates of the vehicle from the steering angle. Alternatively, a turning point can be detected and the present position can be calculated on the basis of correspondence between the position of the turning point and the position obtained from the road system data. The navigation apparatus also has a means for generating traveling direction data for guidance from each intersection to a destination point and a guidance output means whereby traveling direction data is provided in response to the inputting of a destination point; and a road to the destination point is selected at each intersection by the present position calculating means, thereby outputting traveling-direction guidance at the terminal intersection of the presently selected road.

When the thus-constructed navigation apparatus using the present position calculating system is supplied with a code representing the present position, it calculates the present position from data corresponding to a presently selected road, the travel distance and the steering angle. Similarly, at the terminal intersection of this road, another road extending in the travel direction to the destination point is selected from the road system data. The present position is also calculated with respect to the next selected road. In consequence, the provision of data on the traveling direction at respective intersections in the course to the destination point enables the present position to be calculated at each intersection without fixing the courses so long as the destination point is not changed. Guidance is thus performed at each intersection with respect to the direction of travel to the destination point.

BRIEF DESCRIPTION OF THE DRAWINGS

FIGS. 3(a)-3(d) are diagrams of examples of data structures of data on a road system and intersections, data on roads and series of nodes;

DESCRIPTION OF THE PREFERRED EMBODIMENTS

An embodiment of the present invention will be described with reference to the accompanying drawings.

Figure 1:
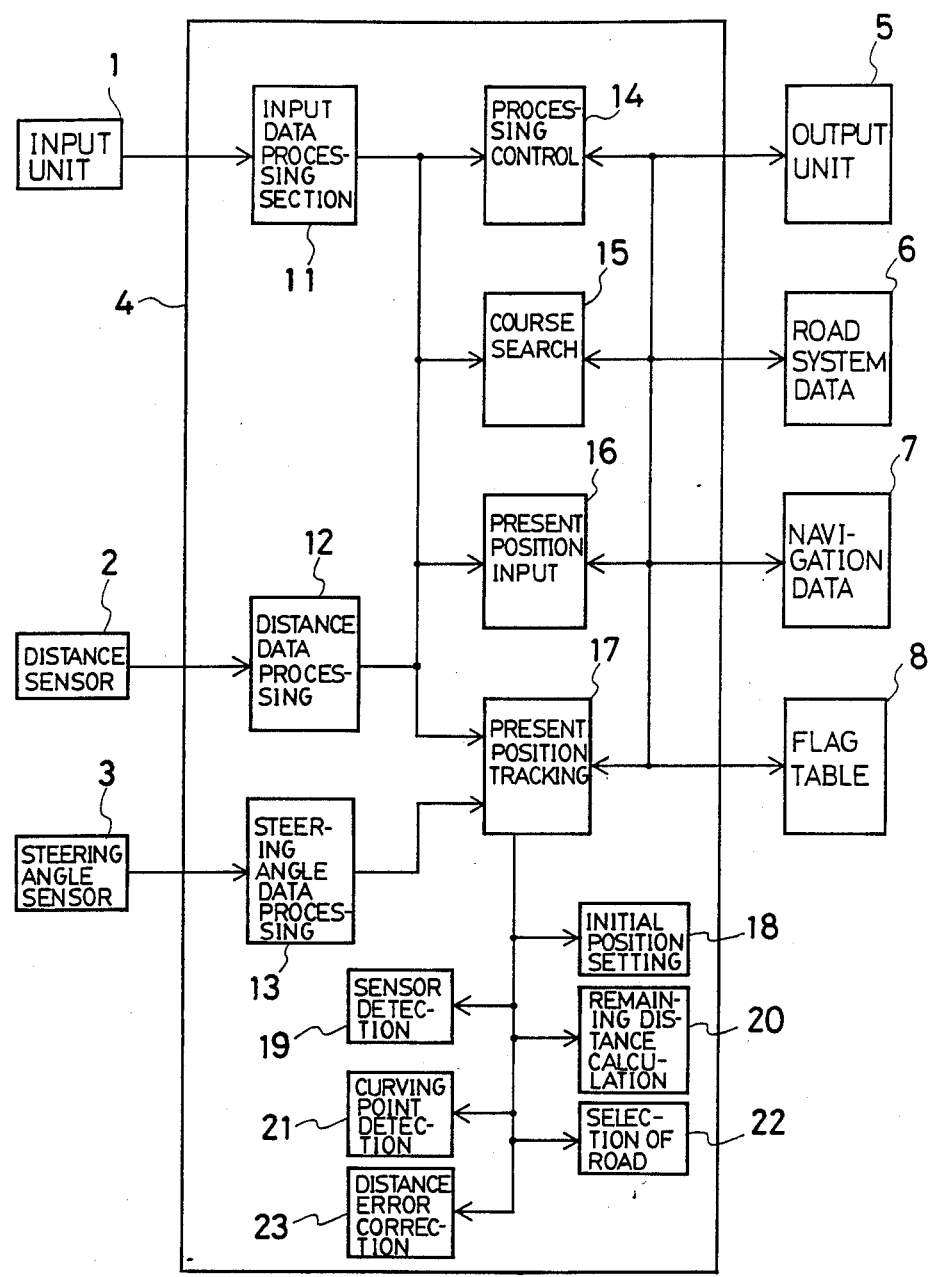
FIG. 1 is a diagram of the construction of a navigation apparatus with a present position calculating system which represents a first embodiment of the present invention.

Referring to FIG. 1, an input unit 1 is constituted by an input means such as a hard key cluster or a means for enabling touch-inputting from the surface of a display screen. The input unit 1 is used to input a destination point, a present position, a starting command and so on. A distance sensor 2 is adapted to detect a distance through which the vehicle has traveled (hereinafter referred to as "travel distance". A steering angle sensor 3 is adapted to detect the steering angle set by the operation of steering the vehicle. An output unit 5 is constituted by a display, a voice outputting device and so on and is used to display a menu necessary for destination input or present position input, or output course-guidance information. Road system data 6 comprises data representing information on intersections, data on roads which connect intersections, and data on series of nodes which represent roads. Navigation data 7 comprises data necessary for navigation including items of data representing course-guidance information and information on a set course. Data on navigation generated by the navigation processing unit 4 is stored as navigation data 7. A flag table 8 which contains flags required during navigation is accessed by the navigation processor 4 on the basis of the state of processing and is updated as desired. The navigation processing unit 4 comprises a microprocessor which accesses the road system data 6, the navigation data 7 and the flag table 8 and processes data or information input from the input unit 1 and detection signals supplied from the distance sensor 2 and the steering angle sensor 3.

The navigation processing unit 4 has an input data processing module 11 for analyzing and processing data or information input from the input unit 1, a distance data processing module 12 for processing detection signals supplied from the distance sensor 2, and a steering angle data processing module 13 for processing detection signals supplied from the steering angle sensor 3, and other belowdescribed processing modules for performing various kinds of processing necessary for navigation on the basis of data or information supplied from from the above processing modules.

A processing control module 14 is adapted to perform overall control processing for the navigation processing unit 4 on the basis of instruction information supplied from the input unit 1. The processing control module 14 controls a course searching module 15, a present position input module 16 and a present position tracking module 17 by referring to the flag table 8.

The course searching module 15 searches an optimum course for guiding the driver to his destination while accessing the road system data 6, when it is supplied with the destination point from the input unit 1. The course searching module 15 sets directions of optimum traveling to the destination point with respect to all intersections listed in the road system data 6. Items of data obtained by searching are stored as navigation data 7. That is, at an intersection, a road on which the driver should direct the vehicle is selected in accordance with a traveling direction to his desired destination set with respect to this intersection and, at the next intersection of this road, another road on which the driver should run the vehicle next is selected in accordance with a traveling direction to his desired destination set in the same manner. This operation is repeated so as to optimize the course along which the driver is led to his destination. The reason for the use of "optimize" rather than "minimize the length of" in this sentence resides in the fact that the course searching is intended to select a course which is shortest when calculated in terms of the time taken for the vehicle to travel through the course under certain conditions including the widths of roads, the number of intersection, the traffic volume and other traveling conditions on the basis of suitable weighing of these factors even if the optimized course is not shortest in terms of absolute distance.

When the present position input module 16 is supplied with the present position from the input unit 1, it recognizes the present position from the road system data 6 and the navigation data 7, draws figures or characters which represent the configuration and orientation of the corresponding intersection, landmarks, the name of the intersection, the road extending in the traveling direction and so forth, and displays them on the screen of the output unit 5 while setting data necessary for navigation. The present position input module 16 then sets required flags in response to the starting input so as to start present position tracking.

The present position tracking module 17 is started when it is supplied with the present position after the course searching has been performed and after the navigation data has been set. The present position tracking module 17 detects the corresponding intersection on the basis of signals supplied from the distance sensor 2 and the steering angle sensor 3, the navigation data 7 and the road system data 6 and repeats this present position recognition processing at every intersection, thereby tacking the present position. The present position tracking module 17 sets states of tracking during the processing as flags in the flag table 8 as desired, and determines proceedings to respective processing steps by referring to these flags. Correspondingly, the present position tracking module 17 is provided with various submodules: an initial position setting module 18, a sensor detection module 19, a remaining distance calculating module 20, a turning point detecting module 21, a road selecting module 22, and a distance error correcting module 23.

The remaining distance calculating module 20 is adapted to calculate the remaining distance to an intersection and performs processing of recognizing the intersection when the remaining distance to the intersection reaches a predetermined value, thereby enabling the present position to be detected at this intersection. The turning point detecting module 21 is adapted to perform processing of recognizing the intersection by detecting a turning start point and a turning completion point within an error range for the intersection so as to detect the position of a turning point corresponding to the position of the intersection. The road selecting module 22 is adapted to detect a road actually selected by the driver for directing the vehicle through the intersection irrespective of whether or not the road which has been selected by the driver extends in the traveling direction corresponding to the set optimum course. Depending upon the result of this detection, the guidance in the traveling direction to the desired destination is performed at the terminal intersection of the selected road. The distance error correcting module 23 is adapted to correct an distance error on the basis of the position of the detected turning point and a selected road to the destination, thereby determining the present position on the selected road to the destination. That is, in this case, the remaining distance to the terminal intersection of the present road is obtained.

Even if the driver fails to drive the vehicle onto the selected road to the destination in accordance with the guidance at an intersection after the guidance for the terminal intersection of this selected road to the destination has been performed by detecting the present position at the intersection and recognizing the selected road in the above-described manner, the driver can be guided along the road actually selected and can continue navigation. Namely, the guidance in the traveling direction at each intersection can be considered as only a suggested guidance, and the present invention is designed to enable the navigation to be continued even if the driver does not select the road in accordance with the guidance as the road on which he will direct the vehicle.

Procedures of various kinds of processing performed by the navigation apparatus based on the present position calculating system in accordance with the present invention will be described below in detail. Examples of the structure of data prepared in the navigation apparatus of the present invention will be described prior to the description of the processing procedures.

Figure 3A:
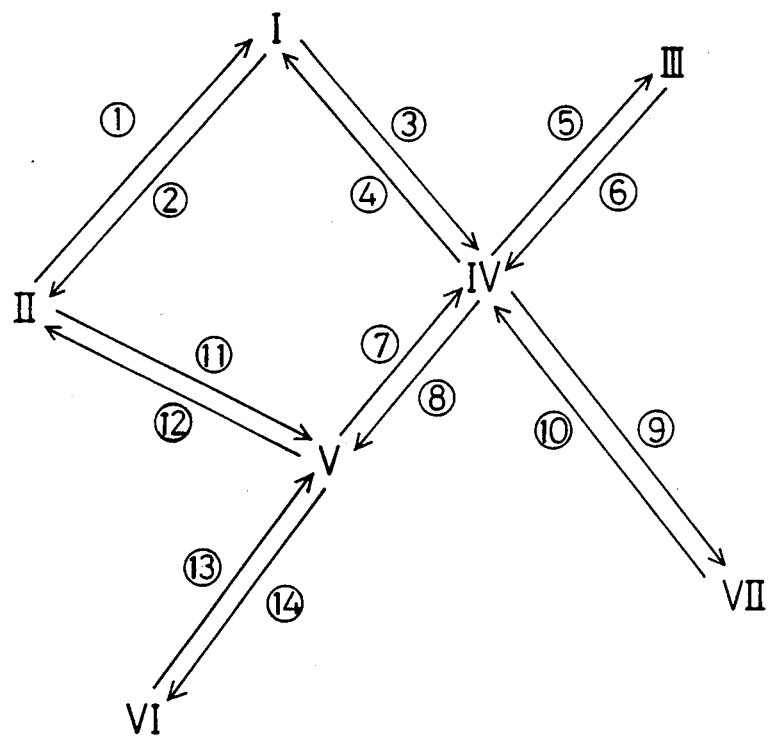

If there is a road system having intersections I to VII and roads ①  to ⑭ as shown in FIG. 3(a), intersection data, road data and the node data have data structures, such as those shown in FIG. 3(b), FIG. 3(c) and FIG. 3(d), respectively.

The intersection data contains groups of data items, each at least comprising the smallest of the road numbers indicating roads having their starting ends connected to one of intersections I to IV, the smallest of the road numbers indicating roads having their terminal ends connected to the same intersection, the position of this intersection (east longitude, north latitude), and information on the name of this intersection.

As shown in FIG. 3(c), the road data contains groups of data items, each at least comprising, with respect to one of road numbers ① to ⑭, the next road number having the same starting point, the next road number indicating roads having the same terminal point, starting and terminal points or ends of each road represented by intersection numbers, a node series pointer, and the length of the road. As is apparent from FIG. 3(c), the next road number having the same starting point or end or the next road number having the same terminal point or end can be obtained by searching for a starting or terminal point or end respectively having the same intersection number. Also, the road length can be obtained by accumulating items of positional information represented by the below-described node series data.

As shown in FIG. 3(d), by an array of items of node series data, the number of nodes is located at the head position to which the node series pointer points, and items of data representing node position (east longitude, north latitude) information are located at subordinate positions. That is, a group of data items representing a series of nodes is formed for each set of road data items.

Examples of groups of data items shown in FIG. 3(d) have series of nodes corresponding to road numbers ①and ②.

As is apparent from the above-described data structures, a group of data items represented by each road number includes a plurality of nodes. That is, the node series data comprises groups of data items each relating to a point on one road. If the interconnection between the nodes is called an arc, a road can be expressed by connecting each of adjacent pairs of nodes in a series of a plurality of nodes. For example, with respect to road number ①, a group of data items A000 can be accessed from the node series pointer in the road data. It is thereby found that the group of data items represented by road number ① includes fifteen nodes.

With respect to a course starting from intersection number V to, for example, intersection number III, road number ⑦ can be first found as a data item representing a leading-out road by searching the intersection data, and road number ⑫ is found as a data item representing "the next or another road number having the same starting end" by searching the road data with respect to the road number ⑦. Road number ⑭ can then be found in data items in the same category relating to road number ⑫, and road number ⑦ can be again found in the same manner. Since, in this case, road number ⑦ which has been found first is found finally, it is possible to determine that there is no other road number indicating a road which connects with the intersection represented by intersection number V. The same can be said with respect to the terminal end. It is thus possible to find road numbers of roads leading out of or leading into each intersection by searching the intersection data and the road data and, hence, to obtain the lengths of roads connecting intersections. Items of data on traveling conditions such as no-advance-into signs, no-right/left-turn signs and the widths of roads can be added to these groups of data items, which can serve as information for finely controlling course searching processing which will be described later.

Figure 2:
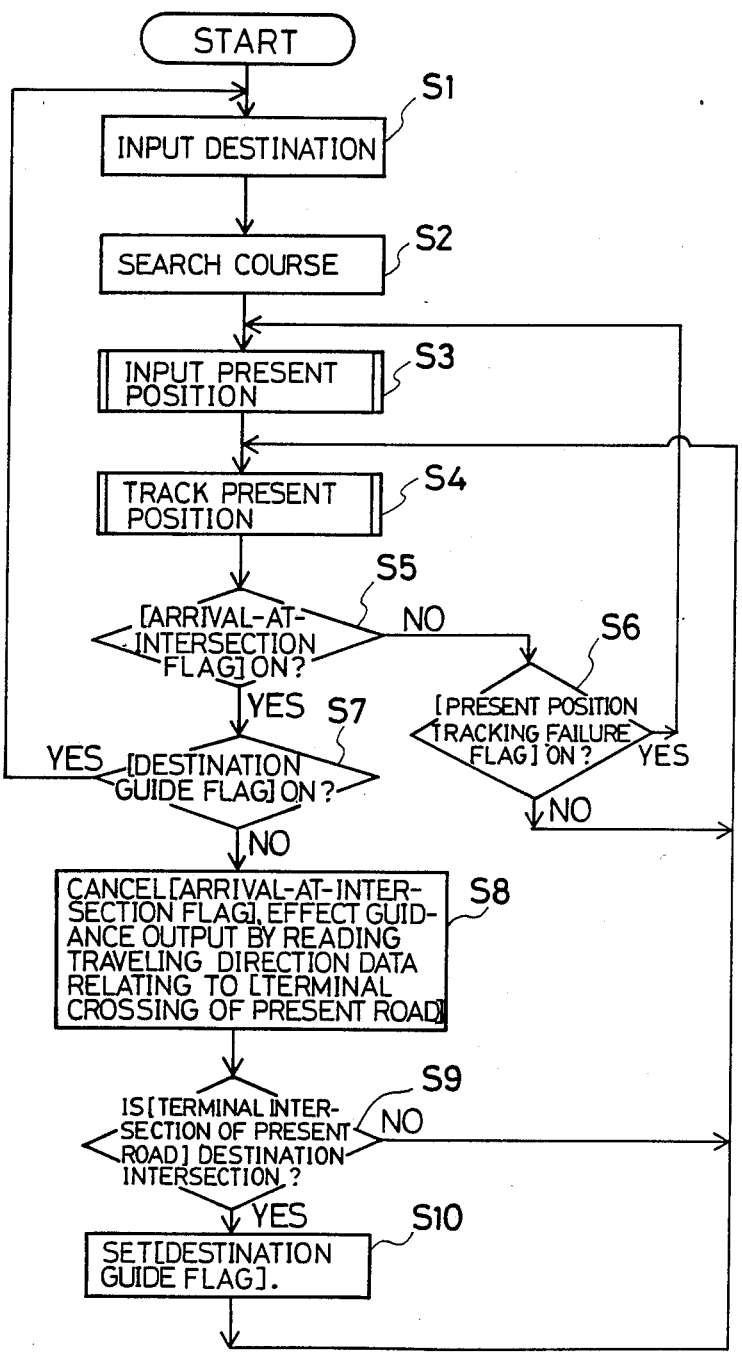
FIG. 2 is a diagram of the flow of entire processing of the navigation apparatus with a present position calculating system shown in FIG. 1.

The flow of the overall processing will be described below with reference to FIG. 2.

Figures 4, 6:
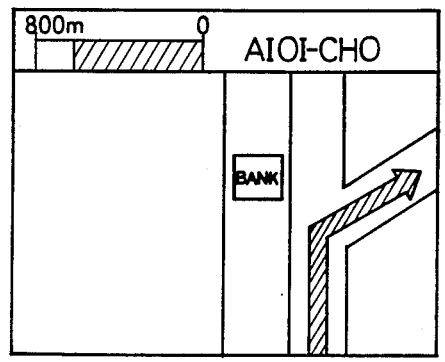
FIG. 4 is a diagram of of an example of a menu display for inputting the destination point.
FIG. 6 is diagram of an example of guidance output.

(S1) A destination point is first input. To effect this, a menu display can be provided, as illustrated in FIG. 4, and numerals representing a destination code ("0001") can be input through a ten key cluster in this display in a touch-input manner.

Figures 5A, 5B:
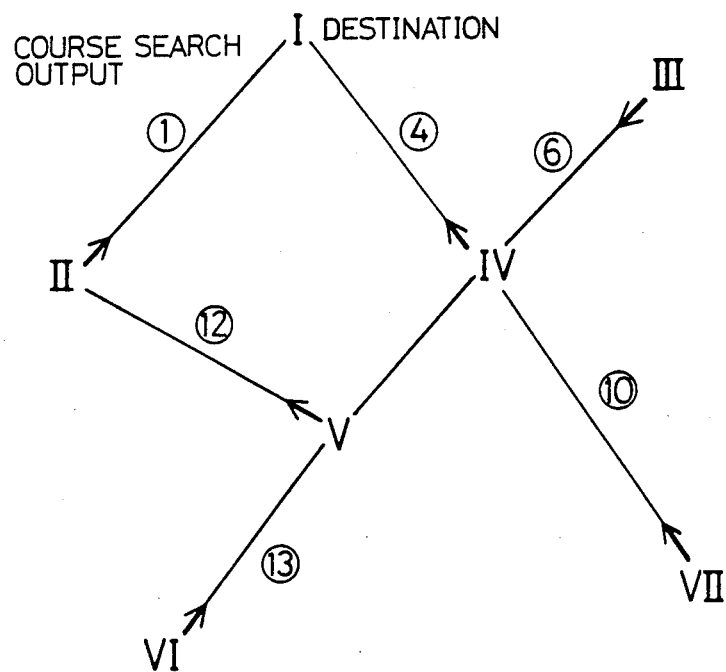
FIGS. 5(a)-5(b) are diagrams of an example of course search output.

(S2) A course search mode is then selected, and an optimum direction of traveling to the destination point is set or provided for each intersection. If, in the road system shown in FIG. 3(a), intersection I coincides with the destination point, directions of traveling to the destination point set at intersections II to VII are as shown in FIG. 5(a). FIG. 5(b) shows examples of data items representing this setting. In this course search process, the traveling directions at respective intersections are successively set from the intersection located nearest to the destination point in such a manner that each direction is selected to minimize the distance to the destination point.

(S3) A present position from which traveling is started is input. In this step, the "present position tracing failure flag" and "destination guide flag", and so on are canceled. This step will be described later in more detail with reference to FIG. 7.

(S4) After the present position inputting step, guidance in the traveling direction at the present position can be performed. Signals supplied from the distance sensor and the steering angles sensor are processed while the vehicle travels, thereby tracking the present position. Details of this step will be described later with reference to FIG. 8. In this step, the "arrival-at-intersection flag" is canceled at an initial stage, the present position is tracked by recognizing informations on the length, and whether or not the vehicle has reached the intersection to which the driver is guided is determined. If it is confirmed that the vehicle has reached the intersection, the "arrival-at-intersection flag" is set. If the intersection to which the driver is guided is not detected, the "present position tracking failure flag" is set.

(S5) After the present position tracking step, whether the "arrival-at-intersection flag" is on or off is examined.

(S6) If the "arrival-at-intersection flag" is off, whether the "present position tracking failure flag" on or off is examined. If the "present position tracking failure flag" is off, the process returns to step S4 to continue the tracking of the present position since it is possible to determine that the vehicle is running on one of the roads registered in the road system data. If the "present position tracking failure flag" is on, it is determined that the vehicle is running on a road other than the roads registered in the road system data, and the process returns to step S3 to perform the operation of inputting a present position as a starting point again.

(S7) If the "arrival-at-intersection flag" is on, whether "destination guide flag" is on or off is examined. "Destination guide flag" is set in step S10, which will be described later, when the terminal intersection of the present road coincides with the destination intersection. So long as "destination guide flag" is on, it is determined that guidance to the destination intersection has been completed, and the process returns to the preceding destination inputting step.

(S8) However, if the "destination guide flag" is still off, it is determined that the destination intersection is located beyond the next intersection, and data on the traveling direction at the terminal intersection of the present road is read out, so that figures representing the configuration and features of the intersection, landmarks, the traveling direction selected at the intersection are drawn and displayed on the screen together with the name of the intersection and the distance to the intersection, thus performing guidance at the intersection. At this time, the "arrival-at-intersection flag" is canceled.

(S9) Then, whether the terminal intersection of the present road coincides with the destination intersection is determined. If it does not coincide with the destination intersection, the process returns to step S4 of present position tracking.

(S10) If the terminal of the present road coincides with the destination intersection, the "destination guide flag" is set and the process returns to step S4 of the present position tracking.

The overall processing is thus conducted.

The above-described steps will be described below in detail with respect to main routines thereof.

Figure 7A:
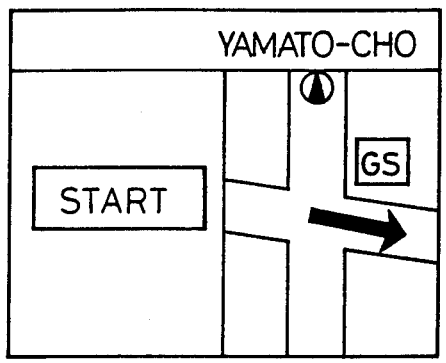
FIGS. 7(a)-7(b) are a diagram and a flow chart of a processing routine for present point inputting.
Figure 7B:
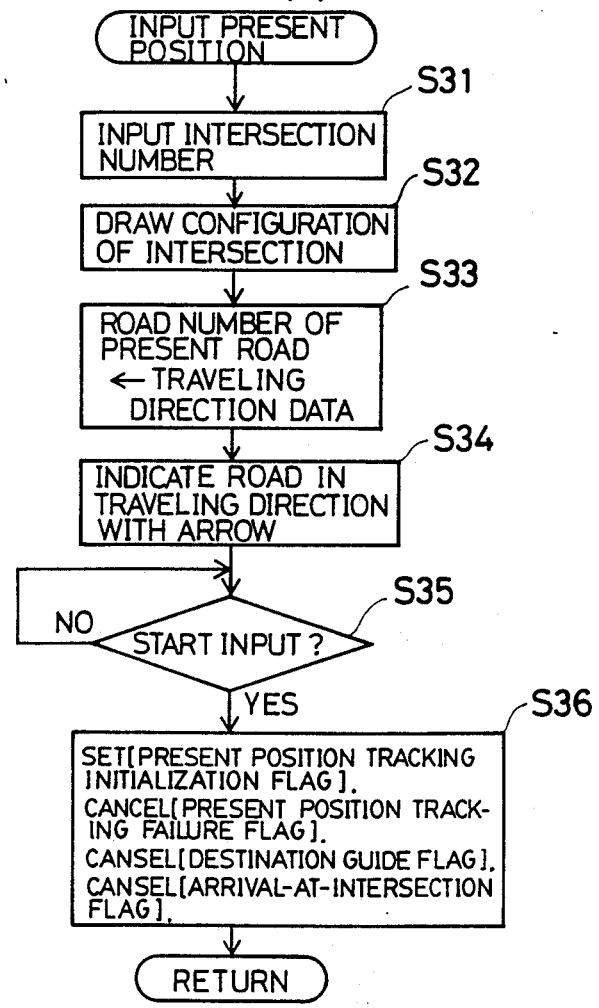

In the processing routine of present position inputting step S3, an intersection number is first input, and the orientation, the configuration and the name of the intersection, landmarks located around the intersection and so on are read from the above-described intersection data, road data and node series data, thereby drawing and displaying the name and features of the intersection as well as the traveling direction on the screen, as shown in FIG. 7(a) (S31, S32). Traveling direction data relating to an intersection number input as the road number of the present road on the basis of the traveling direction data shown in FIG. 5(b) is then stored, and an arrow is drawn to indicate the road in the designated traveling direction, as shown in FIG. 7(a) (S33, S34). Thereafter, the processing waits for a starting input. When the driver inputs a starting command when the vehicle passes through the intersection, the "present position tracking initialization flag" is set while the "present position tracking failure flag", the "destination guide flag" and the "arrival-at-intersection flag" are canceled (S35, S36).

Figure 8:
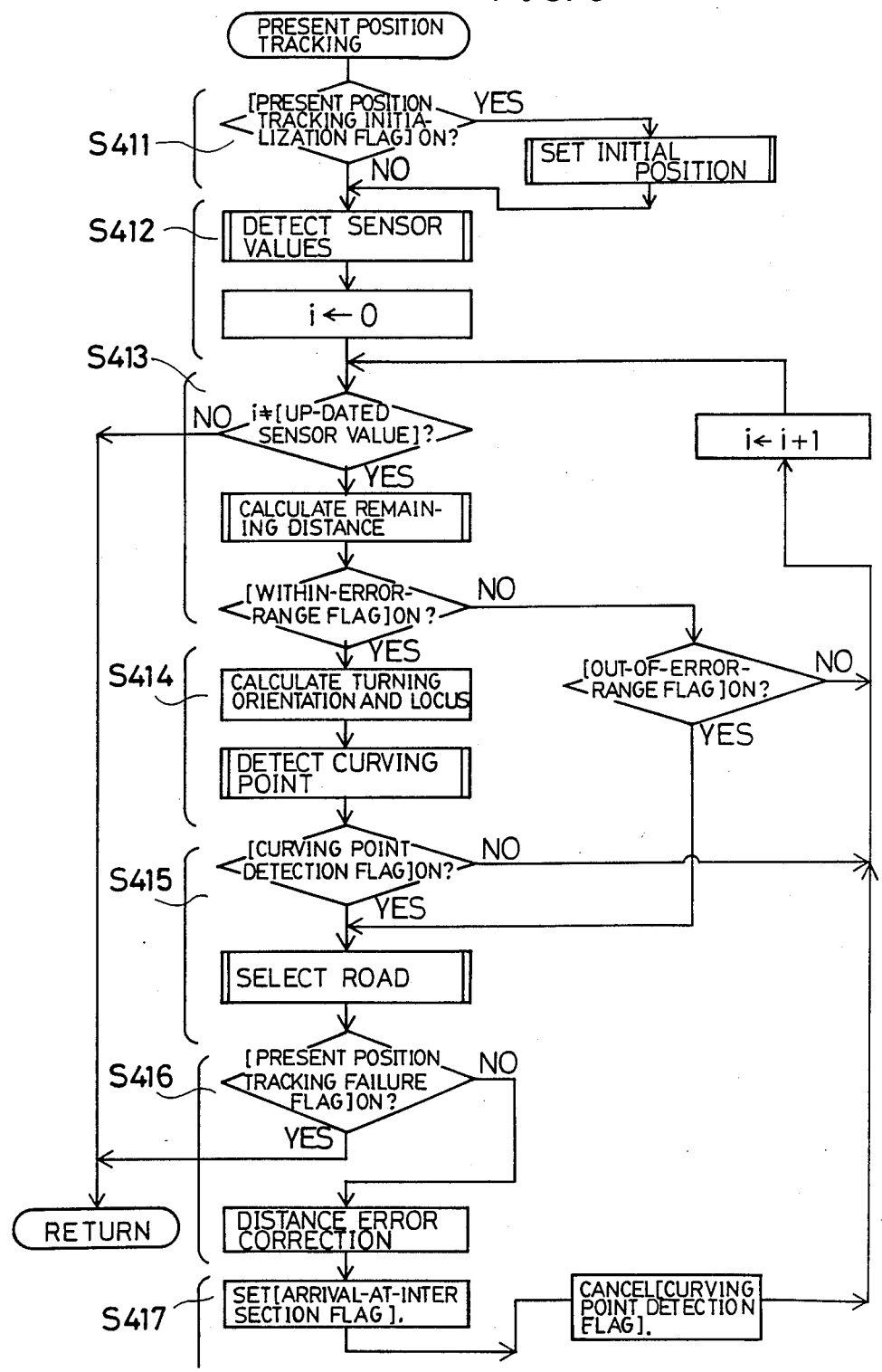
FIG. 8 is a flow chart of a processing routine for present position tracking.
Figure 9:
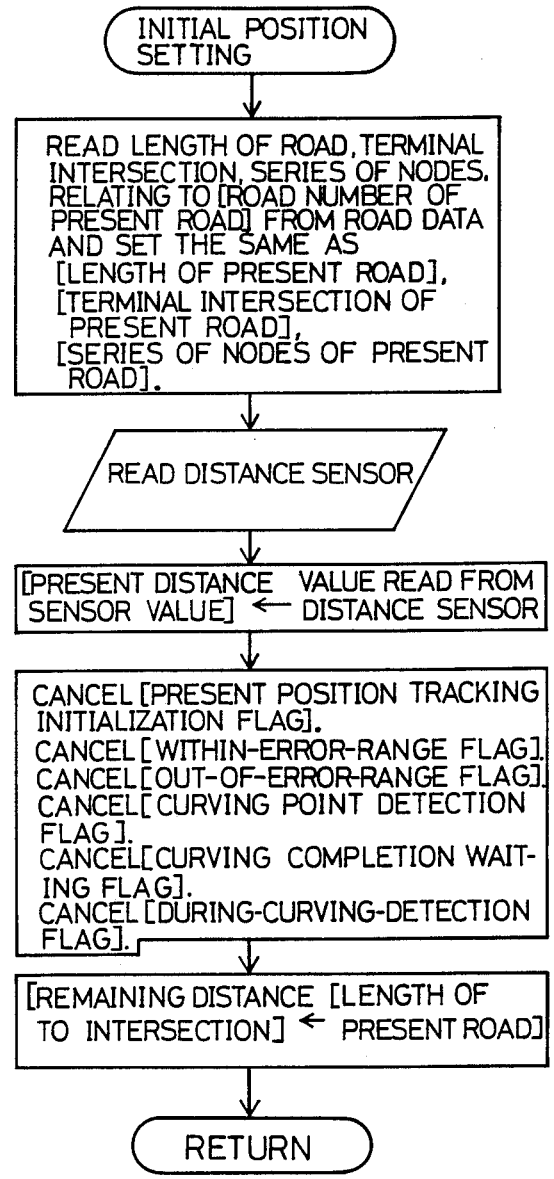
FIG. 9 is a flow chart of a processing routine for initial position setting.

In the present position tracking step routine, as shown in FIG. 8, (S411) Whether or not the "present position tracking initialization flag" is on is first examined. In the case where initial data for present position tracking has not been set, this flag is on and initial position setting shown in FIG. 9 is therefore performed. After this setting has been completed, the "present position tracking initialization flag" is canceled, and the process directly proceeds to the subsequent steps.

In initial position setting, as shown in FIG. 9, the road length, the terminal intersection, a series of nodes are read from the road data and the node series data in accordance the "road number of present road", and values thereby read are set as the "length of present road", the "terminal intersection of present road" and the "series of node of present road". Furthermore, a signal from the distance sensor is read, and a value thereby read is set as the "present distance sensor value". At this time, the "present position initialization flag", the "within-error-range flag", the "out-of-error-range flag", the "turning completion waiting flag", "during-turning-detection flag" are canceled, and the "length of present road" is set to the "remaining distance to intersection".

Figure 10:
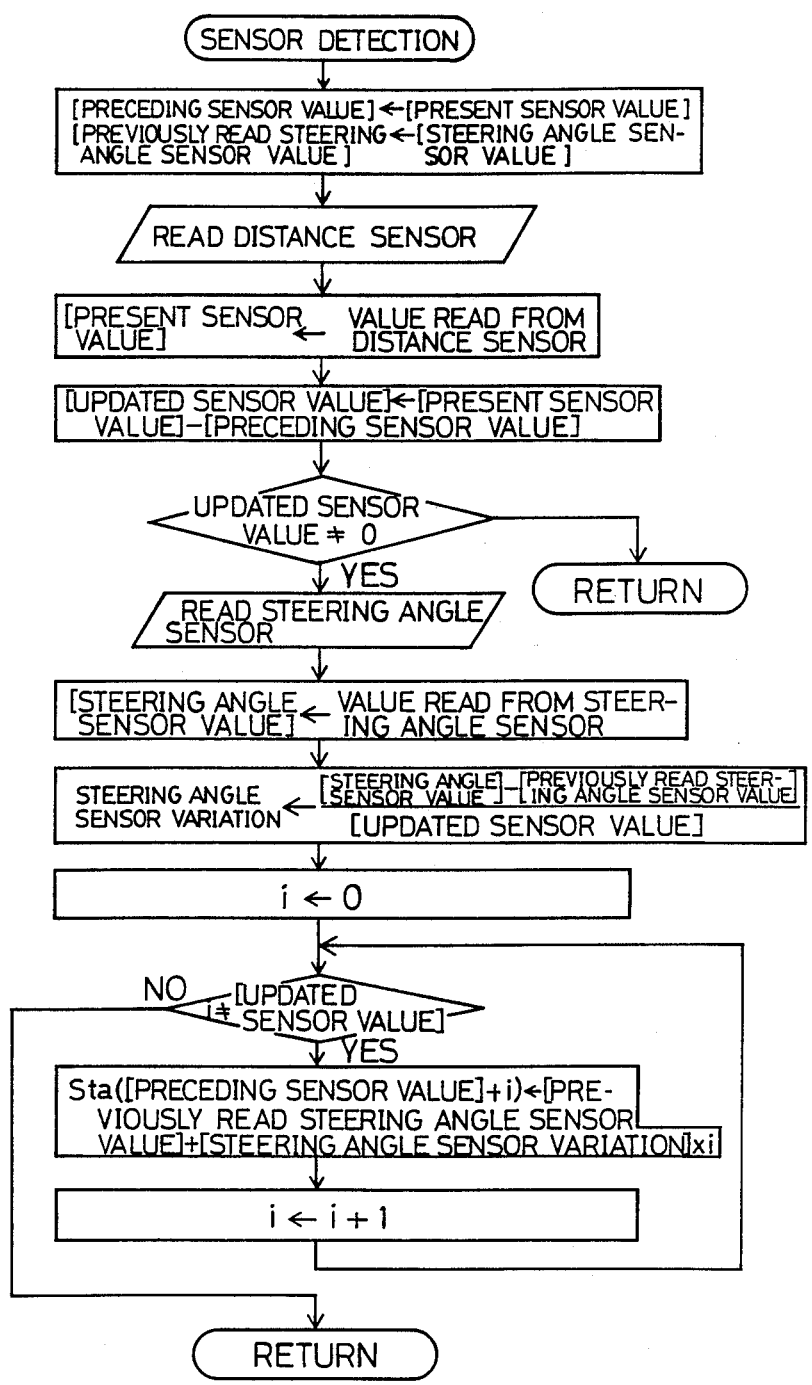
FIG. 10 is a flow chart of a processing routine for sensor detection.

(S412) The sensor detection processing (shown in FIG. 10) is then performed. In this step, present sensor values representing the distance and the steering angle are set as preceding sensor values. Thereafter, new sensor values are read and set as the present sensor values. A change in the steering angle relating to the distance through which the vehicle has traveled is determined, thereby obtaining a steering angle Sta at the present position.

(S413) A loop counter i is set to 0, and remaining distance calculation and other subsequent steps are repeated while loop counter i is incremented until the count value of loop counter i becomes equal to the distance through which the vehicle has traveled.

Figures 11A, 11B:
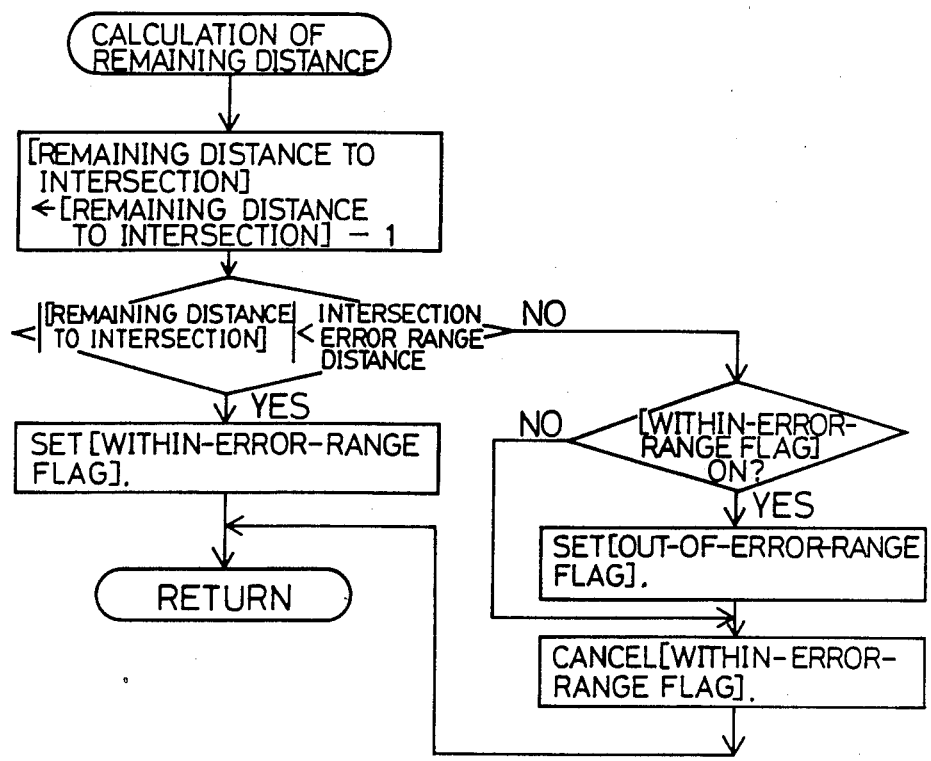
FIGS. 11(a)-11(b) are flow chart and a diagram of a processing routine for remaining distance calculation.

To perform the remaining distance calculation, the remaining distance between the present position and the terminal intersection is stored as present position information with respect to the road number of the present road and the intersection number of the terminal intersection of the present road, as shown in FIG. 11(b). Each time the vehicle travels by a unit distance and a pulse is input from the distance sensor, the distance through which the vehicle has traveled is subtracted from the remaining distance to the intersection, thereby updating the value of the remaining distance. Whether or not the updated remaining distance becomes smaller than an intersection error range distance is determined, as shown in FIG. 11(a). The "within-error-range distance flag" is kept off and the remaining distance calculation is repeated until the remaining distance to the intersection becomes smaller than the intersection error range distance. After the remaining distance to the intersection has become smaller than the intersection error range distance, the "within-error-range distance flag" is set. If the vehicle goes out of the intersection error range after the "within-error-range flag" has been set, the "out-of-error-range flag" is set.

(S414) After the "within-error-range flag" has been set, turning point detection (shown in FIG. 13) is performed by calculating the orientation and the locus of the vehicle.

Figures 12A, 12B, 12C, 12D:
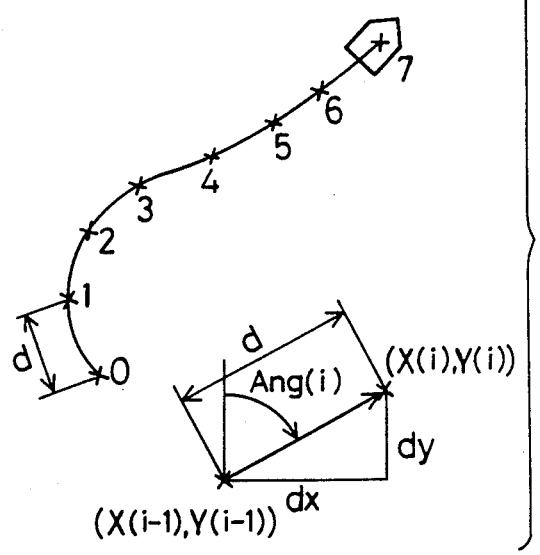
FIGS. 12(a)-12(d) show the calculation of the orientation and the locus of a vehicle.

The calculation of the vehicle orientation/locus is performed in such a manner that, as shown in FIGS. 12(a)–12(d), the travel distance, as shown in FIG. 12(a) and the steering angle Sta are sampled each time the vehicle (FIG. 12(d)) has traveled through a certain distance d; and a new orientation and a locus (coordinates) of the vehicle are calculated from the preceding vehicle orientation Ang and locus (X, Y) and are stored in a, memory. For example, a vehicle orientation Ang (i) (FIG. 12(c)) can be obtained from a steering angle Sta (i) (FIG. 12(b)) read from sensor at each distance and the angle of turning of the vehicle $\theta$ previously stored, by an equation:

$$Ang(i) = \theta(Sta(i)) + Ang(i-1)$$

and a vehicle locus (X (i), Y (i)) is obtained by $$(X(i), Y(i)) = (X(i-1)+dx, Y(i-1)+dy))$$

$$dx = d \times \cos(\pi - Ang(i))$$

$$dy = d \times \sin(\pi - Ang(i))$$

Figure 13:
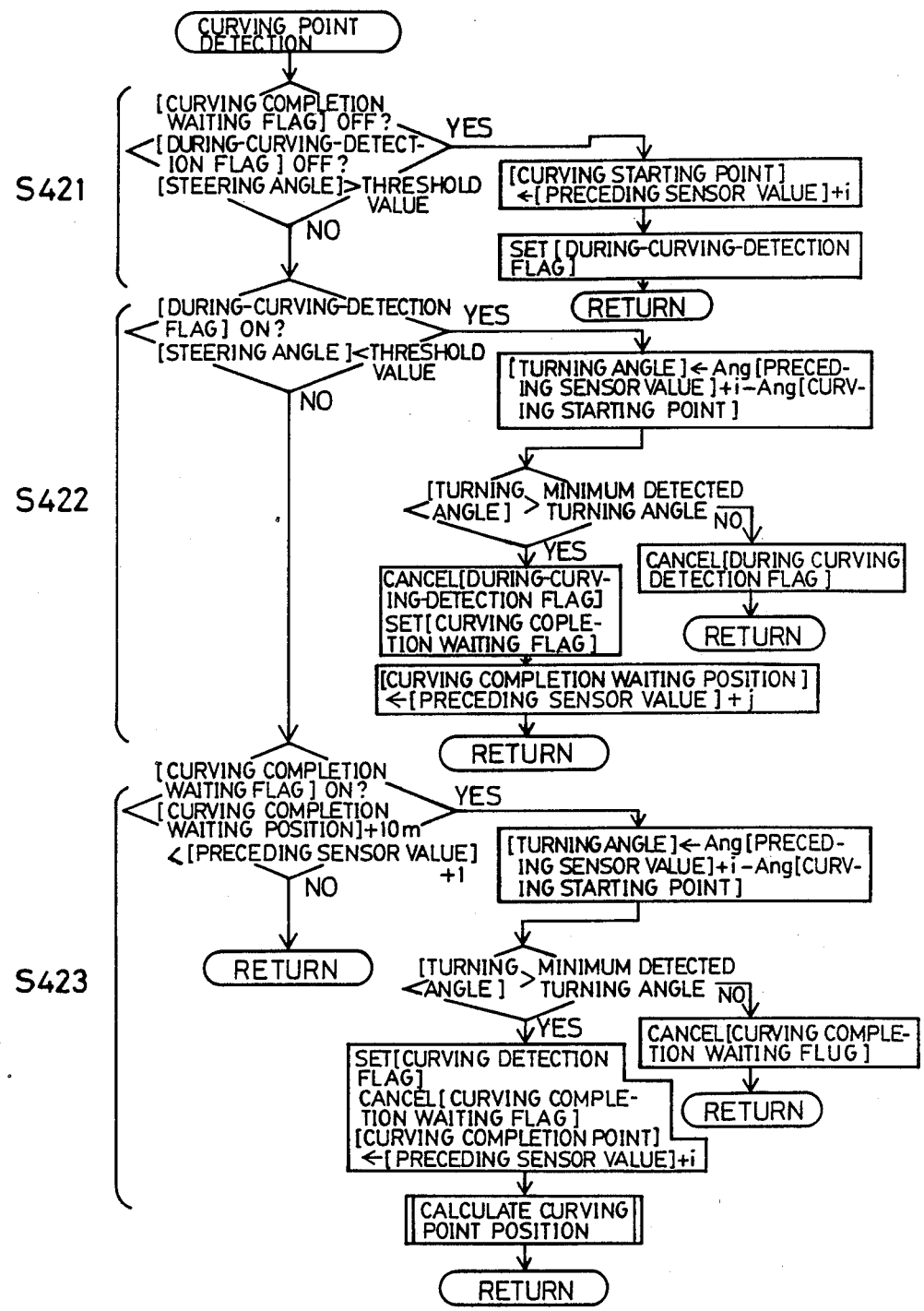
FIG. 13 is a flow chart of a processing routine for turning point detection.

In turning point detection, as shown in FIG. 13 (S421), whether or not the steering angle is larger than a threshold value is first determined, while both the "turning completion flag" and the "during-turning-detection flag" are off. In the case of YES (if the vehicle has started turning), the "turning start point" is set to the present distance ("preceding sensor value"+i), and the "during-turning-detection flag" is set. That is, when the steering angle becomes larger than the threshold value for the first time, turning detection processing is therefore started. In the case of NO (during turning detection of an apparent straight-line running with steering angles smaller than the threshold value).

(S422), whether or not the steering angle is smaller than the threshold value is determined while the "during-turning-detection flag" is on. In the case of YES (turning is detected at the preceding time and turning is completed at this time), the turning angle is set to the difference between the present orientation and the orientation at the turning start point. Then, whether or not the turning angle is larger than the minimum detected turning error is examined. If the turning angle is equal to or smaller than the minimum detected turning error, the "during-turning-detection flag" is cancelled, since it is not possible to determine that the vehicle has turned completely at the intersection. If the turning angle is larger than the minimum detected turning error, it is possible to determine that the turning at the intersection has been completed, and the "turning completion waiting flag" is set while "during-turning-detection flag" is cancelled. At the same time, the "turning completion waiting position" is set to the present distance, which operation is utilized for detection of the position of the turning point. In the case of NO (turning has been completed, the system is still in the turning detecting state, or the vehicle is in a straight-running state).

(S423), whether or not ("turning completion waiting position" + 10 m) is smaller than the present distance is determined, while the "turning completion waiting flag" is on. In the case of YES (the vehicle has traveled by 10 m after the turning completion), the turning angle is set to the difference between the present orientation and the orientation at the turning start point. Then, whether or not the turning angle is larger than the minimum detected turning error is examined. If the turning angle is equal to or smaller than the minimum detected turning error, the "turning completion waiting flag" is canceled. If the turning angle is larger than 20°, the "turning point detection flag" is set while the "turning completion waiting flag" is canceled. At the same time, the "turning completion point" is set to the present distance to perform the calculation of the turning point position.

(S415) Whether or not "turning point detection flag" is on is examined. If it is off, the counter i is incremented and the same steps are repeated. If it is on, road selection is performed.

In the case where the remaining distance has become smaller than the intersection error range distance so that the "within-error-range flag" has been set but the vehicle goes out of the intersection error range while the "turning point detection flag" is still off because the turning point is not detected, the "within-error-range flag" is set and "out-of-error-range flag" is canceled, as described above with respect to S413. This state of processing involves the case where the vehicle passes through the intersection without turning. In this case also, the next road is selected in the same manner.

Figure 14:
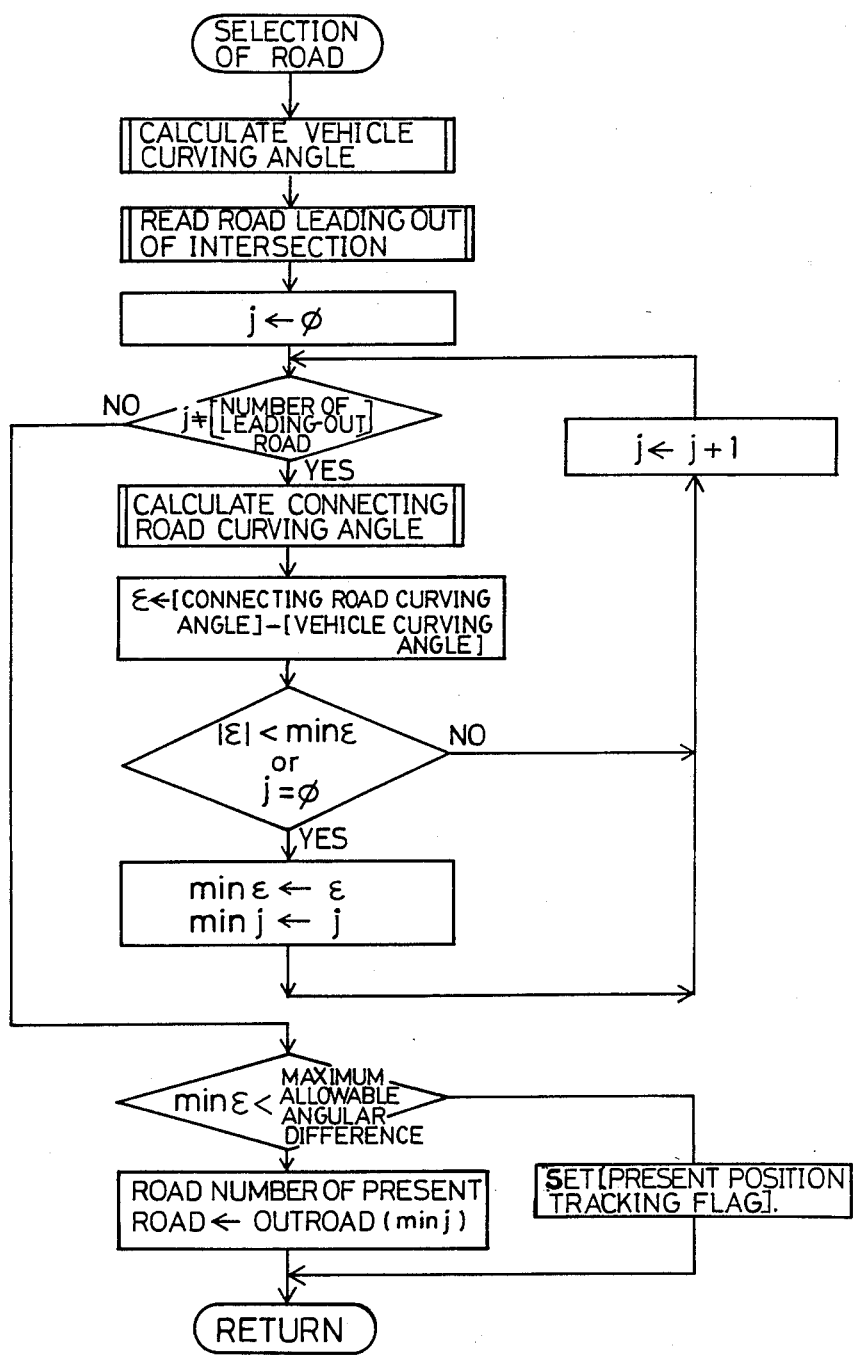
FIG. 14 is a flow chart of a processing routine for road selection.

To select a road, the angle by which the vehicle turns is first calculated, as shown in FIG. 14. Then, roads having their starting point at the intersection are read and the bending angle of each of these connecting roads is calculated, thereby obtaining a minimum value of the difference between the connecting road bending angle and the vehicle turning angle. If the minimum value is smaller than a predetermined maximum allowable differential angle, the corresponding road number is set as the "road number of present road". If the minimum value is larger than the predetermined maximum allowable differential angle, it is determined that the road to be selected has not been detected, and the "present position tracking failure flag" is set. That is, a road having a bending angle most approximate to the vehicle turning angle is selected as the road exiting the intersection from all the connecting roads. If the difference of these angles is excessively large, it is determined that the present position cannot be obtained and that it must be reset.

(416) Whether or not the "present position tracking failure flag" is one is examined. If it is on, the process returns from steps S5, S6 to step S3, as shown in FIG. 2. If it is still off, distance error correction is successively performed.

Figure 15:
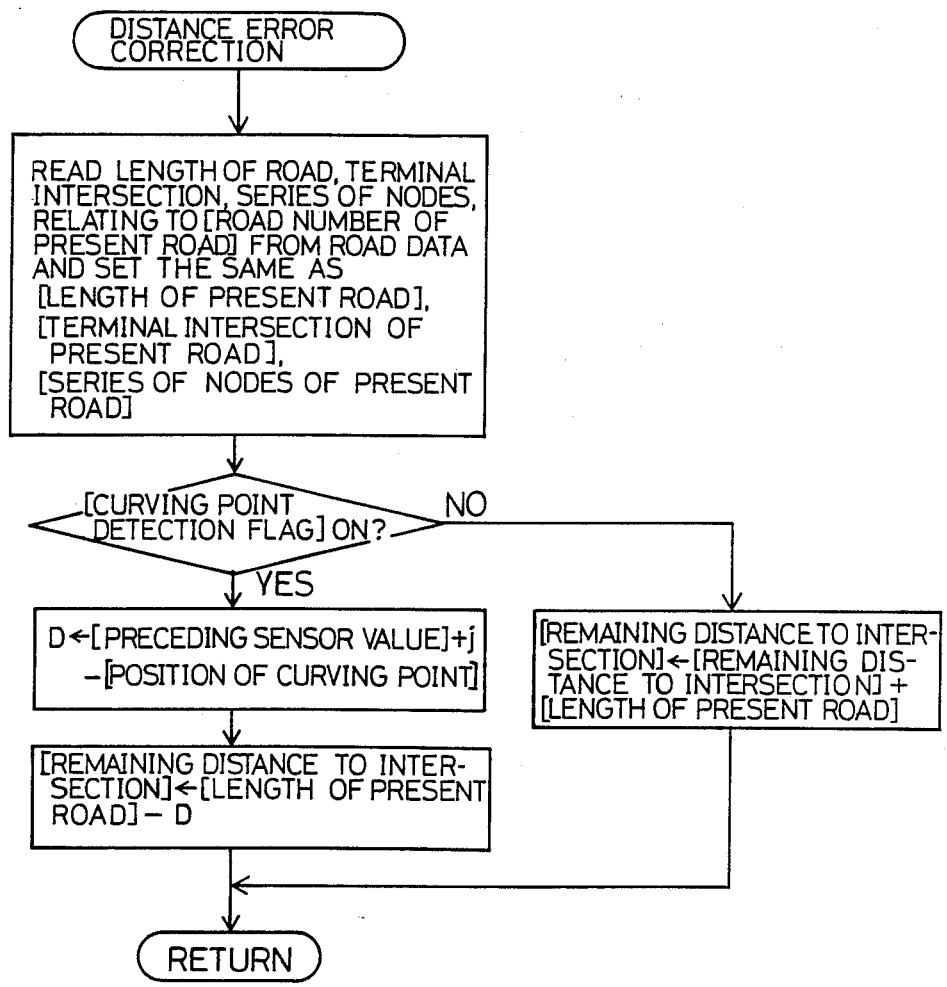
FIG. 15 is a flow chart of a processing routine for distance error correction.
Figure 16A:
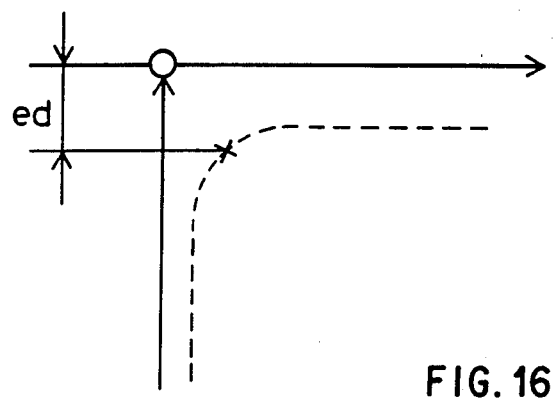
FIGS. 16(a)-16(b) are diagrams of contents of distance error processing.
Figure 16B:
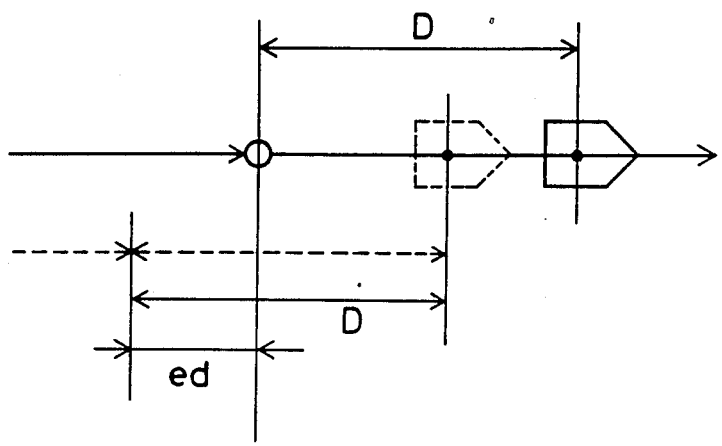

To perform distance error correction, the road length, the terminal intersection and a series of nodes are read from the road data and the node series data with respect to the "road number of present road" in the same manner as in the case of the initial position setting, as shown in FIG. 15. Values thereby read are set as the "length of present road", the "terminal intersection of present road", and the "series of nodes of present road". Whether or not the "turning point detection flag" is on is then examined. A difference D between the present distance ("preceding sensor value" + i) and the turning point position is determined, the value D is subtracted from the "length of present road", and the resulting value is set as the "remaining distance to intersection". In short, in this processing, errors accumulated until the vehicle turns at the intersection and advances onto the next road are corrected with respect to the length of the next road. However, if the "turning point detection flag" is off, the "remaining distance to intersection" is updated by adding the "length of present road" to the preceding value of the "remaining distance to intersection". This corresponds to the case where the vehicle has passed through the intersection without turning thereat. If, for example, the "remaining distance to intersection" has become naught at that intersection, the "length of present road" is set as a new "remaining distance to intersection" without being changed. FIG. 16 shows the results of error correction with respect to the case where a turning point has been detected and the case where no turning point has been detected. If, as shown in FIG. 16(a), the distance between the turning point position and the intersection position is ed, the remaining distance to the next intersection is corrected by D with the turning point set as the position of the intersection, as shown in FIG. 16(b).

(S417) The "arrival-at-intersection flag" is set, and loop counter i is incremented, thereby repeating the same processing.

Next, the calculation of a turning point at an intersection will be described below.

Figure 17:
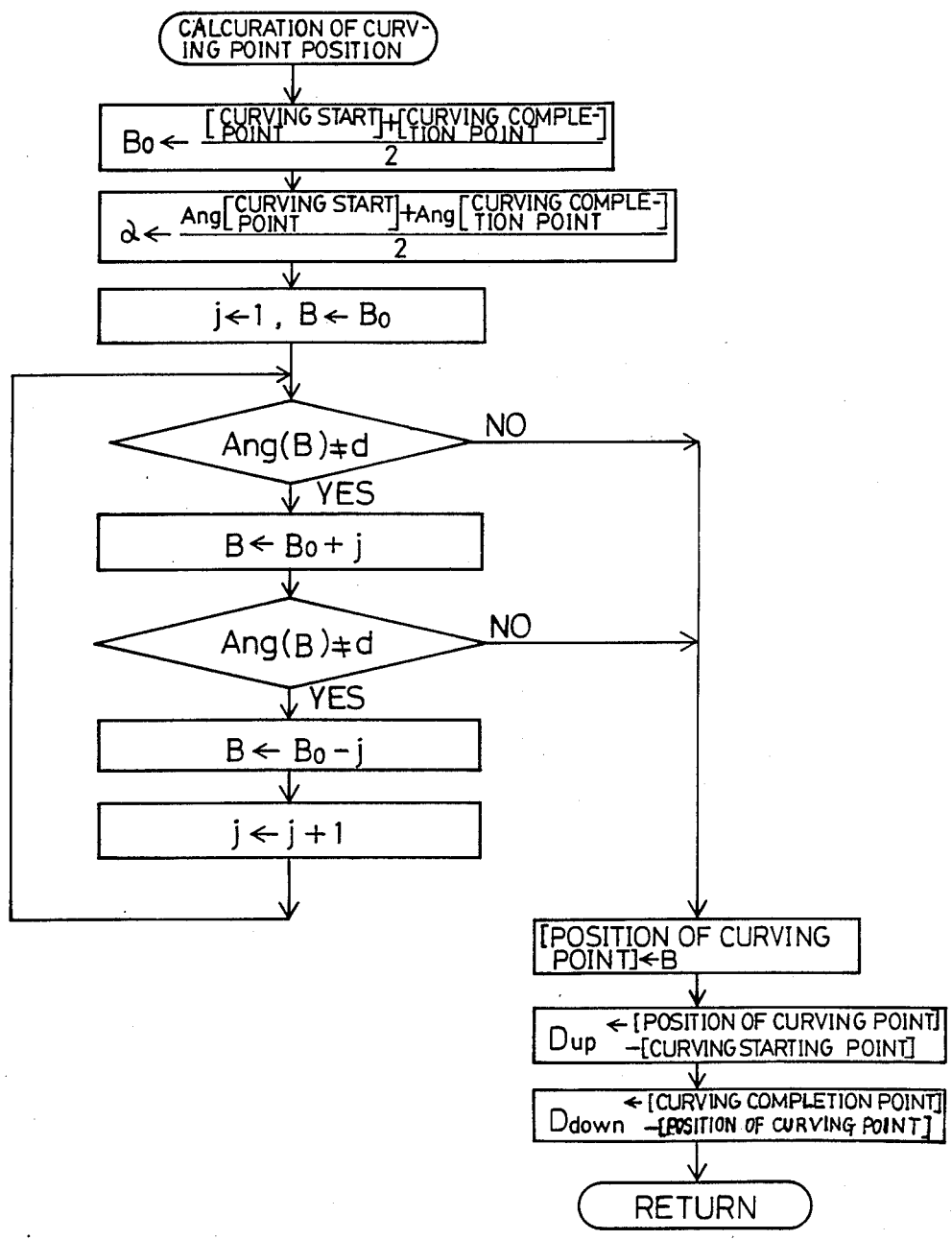
FIG. 17 is a flow chart of a processing routine for turning position calculation.

To calculate the position of a turning point in the turning point detection processing (FIG. 13), as shown in FIG. 17, a mean distance $B_0$ between a turning start point A and a turning completion point C and a mean orientation d of the vehicle orientation Ang are obtained; loop counter j is set to 1; and a distance B is set to the mean distance $B_0$. A point is searched at which a vehicle orientation Ang (B) at the distance B coincides with the mean orientation d or these orientations coincide with each other while loop counter j is incremented to set $B_0 \pm j$ as B. The coincidence point B is set as the turning point position. Then, a distance $D_{up}$ between the turning start point A and the turning point position B and a distance $D_{down}$ between the turning point position B and the turning completion point C are obtained, as shown in FIG. 18(d) and 18(c). FIGS. 18(a)–18(e) show the relationship between major factors relating to this processing.

Figure 18A:
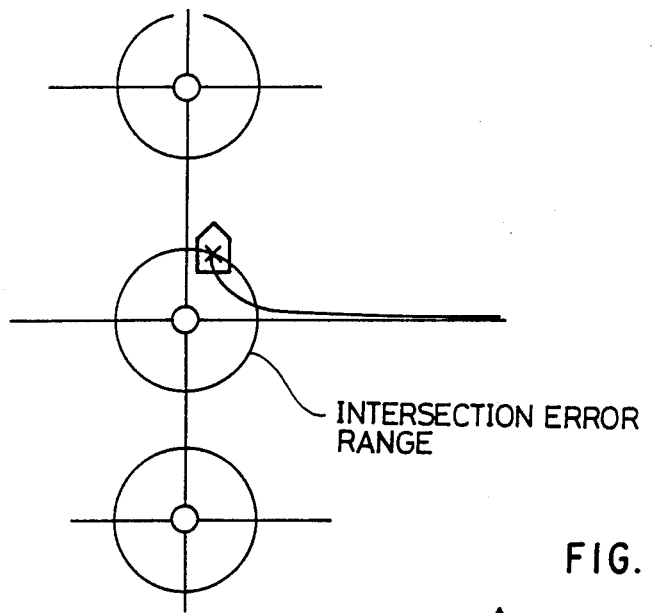
FIGS. 18(a)-18(e) are diagrams of a processing information relating to road selection.
Figure 18B:
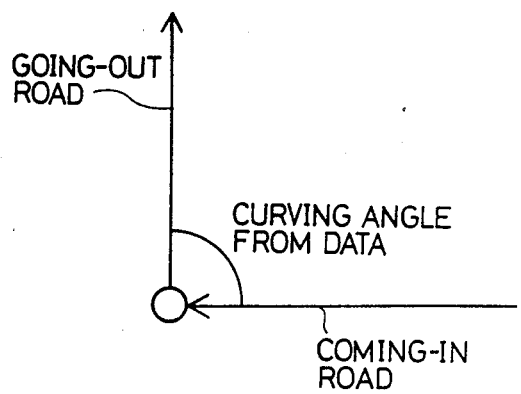
Figure 18C:
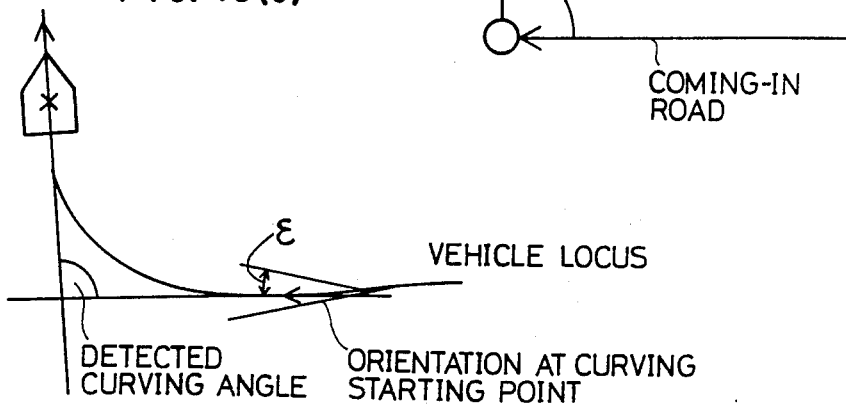
Figure 18D:
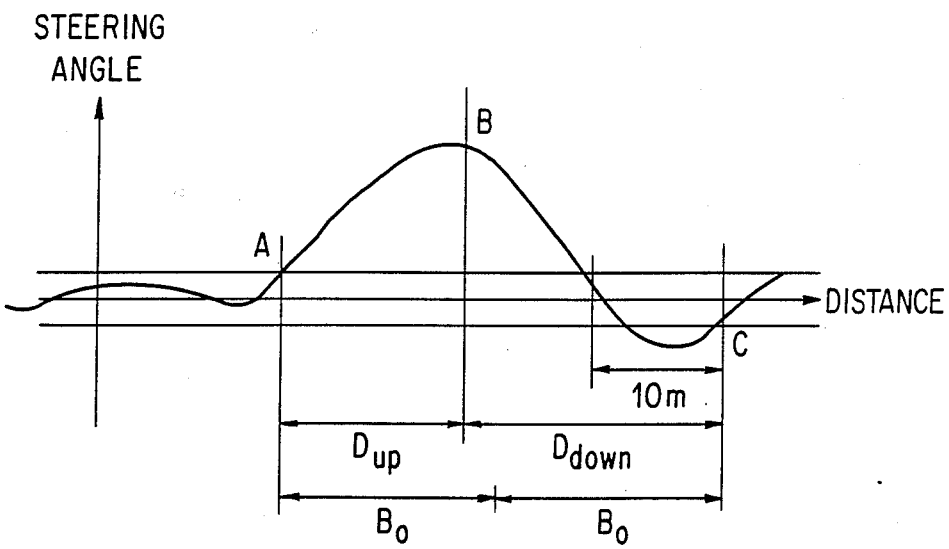

The calculation of the position of the turning point and the calculation of the next turning angle are performed on the basis of the orientation and the locus coordinates of the vehicle detected while the vehicle enters the intersection error range and goes out of the same by selecting the exiting or going out road, as shown in FIG. 18(a). If the bending angle based on data between the coming-in road (leading-in road) and the going-out load (leading-out road) connecting with each other at the intersection is as illustrated in FIG. 18(b), the vehicle normally exhibits a locus such as that shown in FIG. 18(c), and the steering angle changes as shown in FIG. 18(d). If the steering angle exceeds the threshold value at a point as shown in FIG. 18(d), this point is detected as the turning start point A. If the steering angle returns, at a point, to a value smaller than the threshold value, this point is set as a turning completion waiting position C', and a point t which the vehicle travels from the point C' by 10 m is detected as the turning completion point C.

Figure 18E:
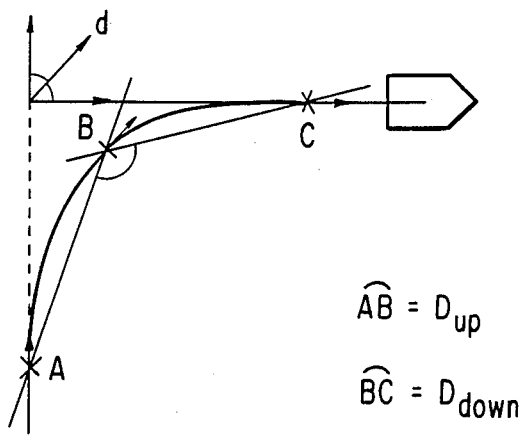
Figure 19:
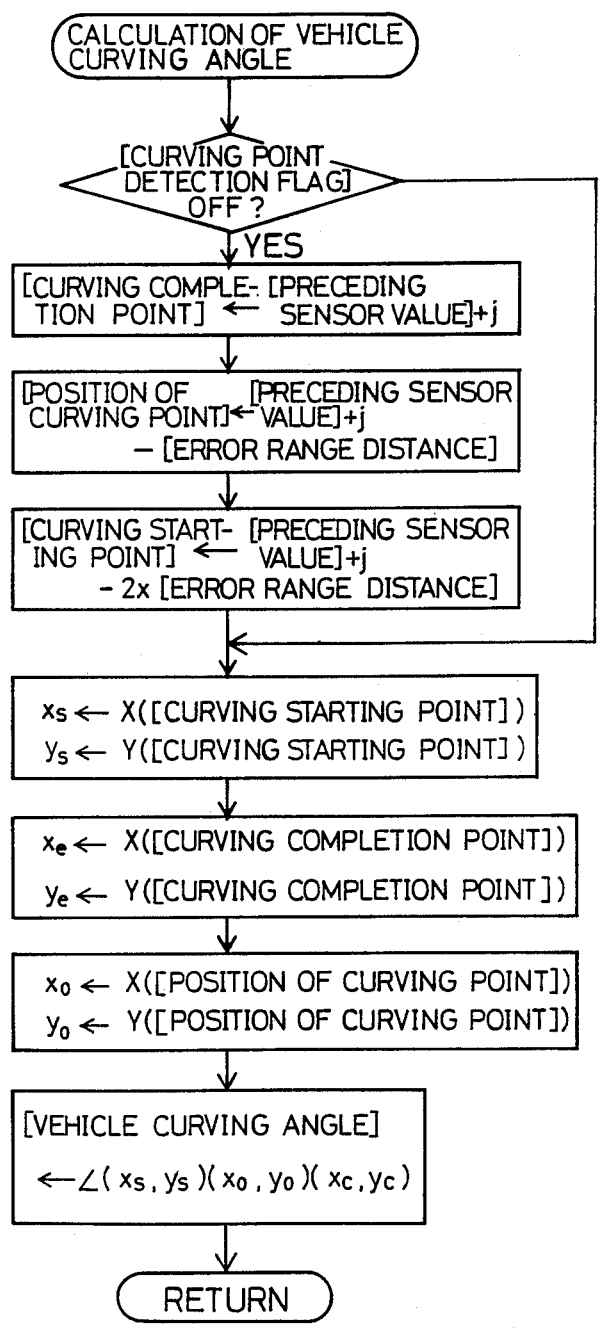
FIG. 19 is a flow chart of a processing routine for calculation of the vehicle turning angle.

To calculate the vehicle turning angle in the road selection processing (FIG. 14), whether "turning point detection flag" is on or off is examined. If it is on, the turning completion point, the turning point position and the turning start point are obtained by the turning point detection processing (FIG. 13). If the flag is off, these values are not obtained and next values are set. That is, the present distance ("preceding sensor value"+i) is set as the turning completion point, a value obtained by subtracting the intersection error range distance from the present distance is set as the turning point position, and a value obtained by subtracting a value twice as large as the intersection error range distance from the present distance is set as the turning start point. $\angle ABC$ shown in FIG. 18(e) is obtained as the vehicle turning angle from the coordinates of these three points.

Figure 20:
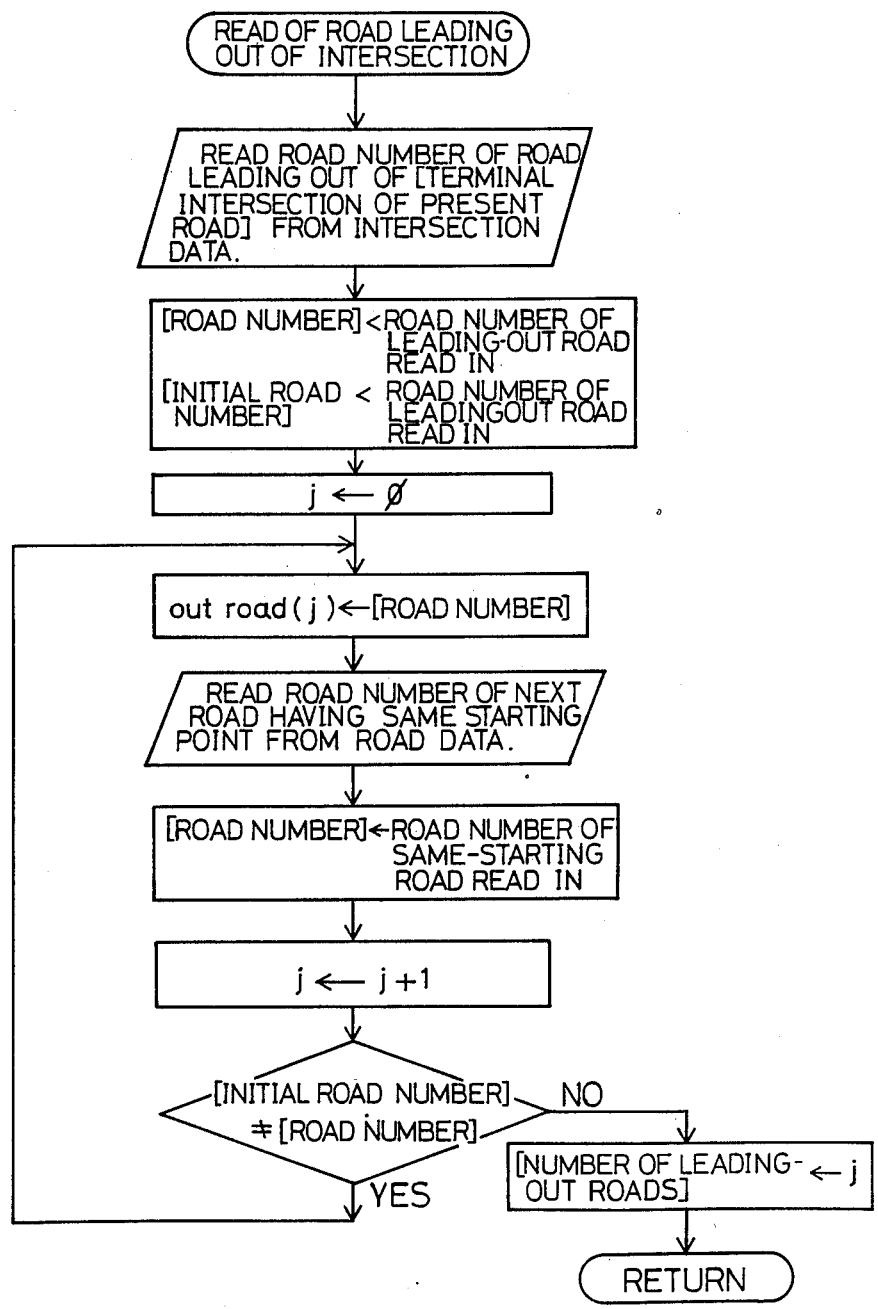
FIG. 20 is a flow chart of a processing routine for reading roads leading out of an intersection.

After the vehicle turning angle calculation has been completed, the road leading out of the intersection is read. In this processing, as shown in FIG. 20, one road number of road numbers indicating roads having the same starting point as (leading out of) the terminal intersection of the present road is read from the intersection data, and the road number thereby read is set as the "road number" and the "initial road number". Loop counter j is set to 0. Thereafter, the road data is read while loop counter j is incremented until the next one of the road numbers indicating roads having the same starting point coincides with the "initial road number", thereby successively reading out the rest of the road numbers having the same starting point. The number of road numbers thereby read is set as the "number of leading-out roads".

Figure 21:
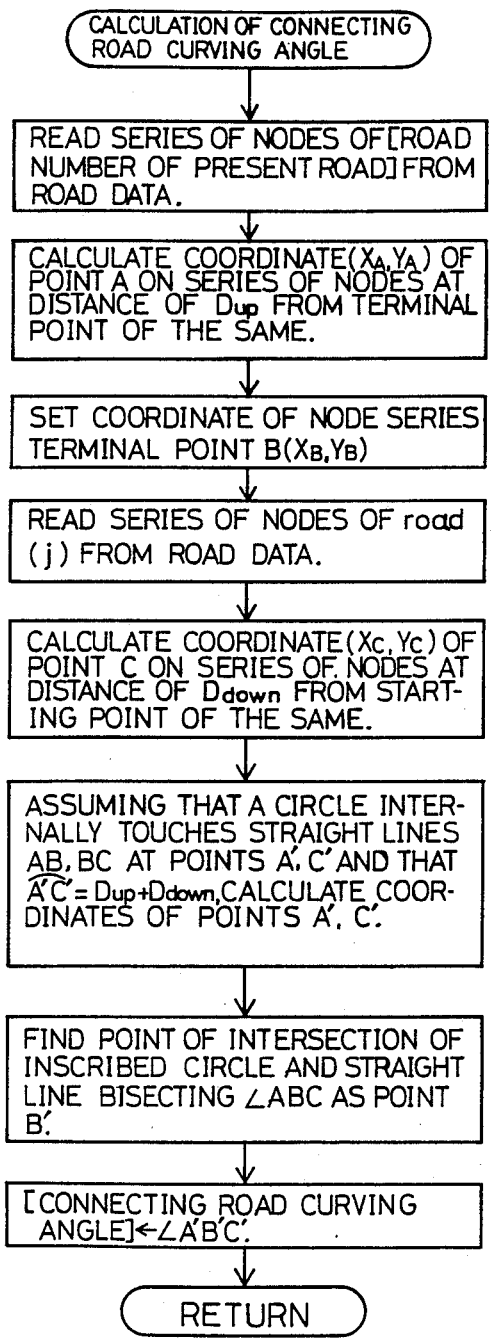
FIG. 21 is a flow chart of a processing routine for calculation of connecting road bending angle.
Figure 22:
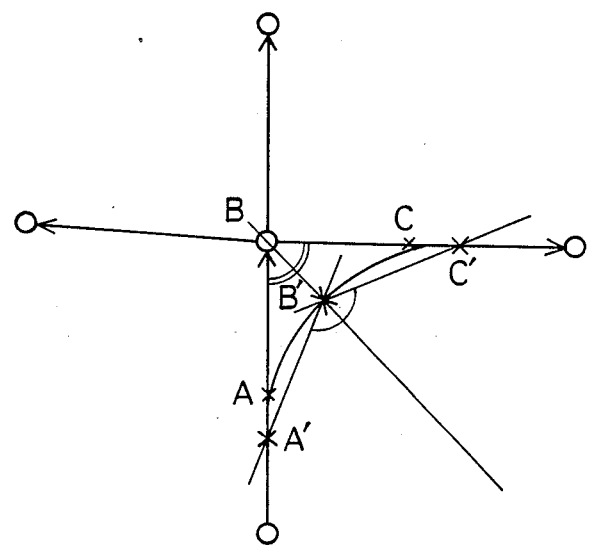
FIG. 22 is a diagram of a method of obtaining the connecting road bending angle.

To calculate the connecting road bending angle in the road selection processing (FIG. 14), the series of nodes relating to the road number of the present road is read from the road data and the node series data, and the coordinate $(x_A, y_A)$ of the point D located at the distance $D_{up}$ from the terminal point of this series is calculated, as shown in FIG. 21. The terminal point B of the series of nodes has a coordinate $(x_B, y_B)$. Next, the series of nodes of the road leading out of the intersection is read from the road data and the node series data, and the coordinate $(x_C, y_C)$ of the point C located at the distance $D_{down}$ from the starting point of this road is calculated. On the basis of these coordinates, it is assumed that a circle internally touches straight lines AB, BC at the points A', C' and that the length of an arc (A'C') is equal to $D_{up}+D_{down}$, the Coordinates of the points A' and C' are calculated, and the point of intersection of the inscribed circle and a straight line bisecting $\angle ABC$ is found as a point B'. $\angle A'B'C'$ thereby obtained is set as the "connecting road bending angle". FIG. 22 shows the relationship between these coordinates and angles.

As described above, various flags are used for information processing in the navigation apparatus based on the present position calculating system in accordance with the present invention. The functions of the flags are as follows.

"Arrival-at-intersection flag": If it is on, guidance output for a next intersection is effected. It is canceled during the present position inputting step, and it is set when the vehicle passes through an intersection.

"Destination guidance flag": If it is on when the vehicle arrives at an intersection, it is determined that the vehicle has arrived at the destination point, and the process returns to the start of the main routine (destination inputting step). It is canceled during the present position inputting step, and it is set at the time of the outputting of next intersection guidance if the next intersection coincides with the destination point.

"Present position tracking failure flag": If it is on, the process returns at the present position inputting step, so as to perform present position inputting again in the main routine. It is canceled during the present position inputting step, and it is set if there is no road to be selected at the time of road selection.

"Present position tracking initialization flag": If it is on, the initial position setting routine is called. It is canceled at the time of initial position setting, and it is set at the time of present position inputting.

"Within-error-range flag": If it is on, the calculation of the locus, turning point detection, and so forth are performed. It is set if the vehicle is within the intersection error range or, if not, it is canceled.

"Out-of-error-range flag": If it is on, road selection is performed. It is set if the vehicle goes out of the intersection error range or, if not, it is canceled.

"Turning point detection flag": If it is on, road selection is performed during present position tracking, and the present position is reset during distance error correction. If it is off, the turning start point, the turning completion point and the turning point position are determined during vehicle turning angle calculation. It is canceled at the time of initial position setting, it is set if a turning point is detected, and it is canceled after distance error correction.

"During-turning-detection flag", the "turning completion waiting flag": They are used for turning detection and turning completion detection, and are canceled at the time of initial position setting. The "during-turning-detection flag" is set if the steering angle exceeds the threshold value. On/off states of these flags are controlled whether or not the turning angle exceeds the minimum detected turning angle.

Next, another embodiment of the present invention will be described below.

Figure 23:
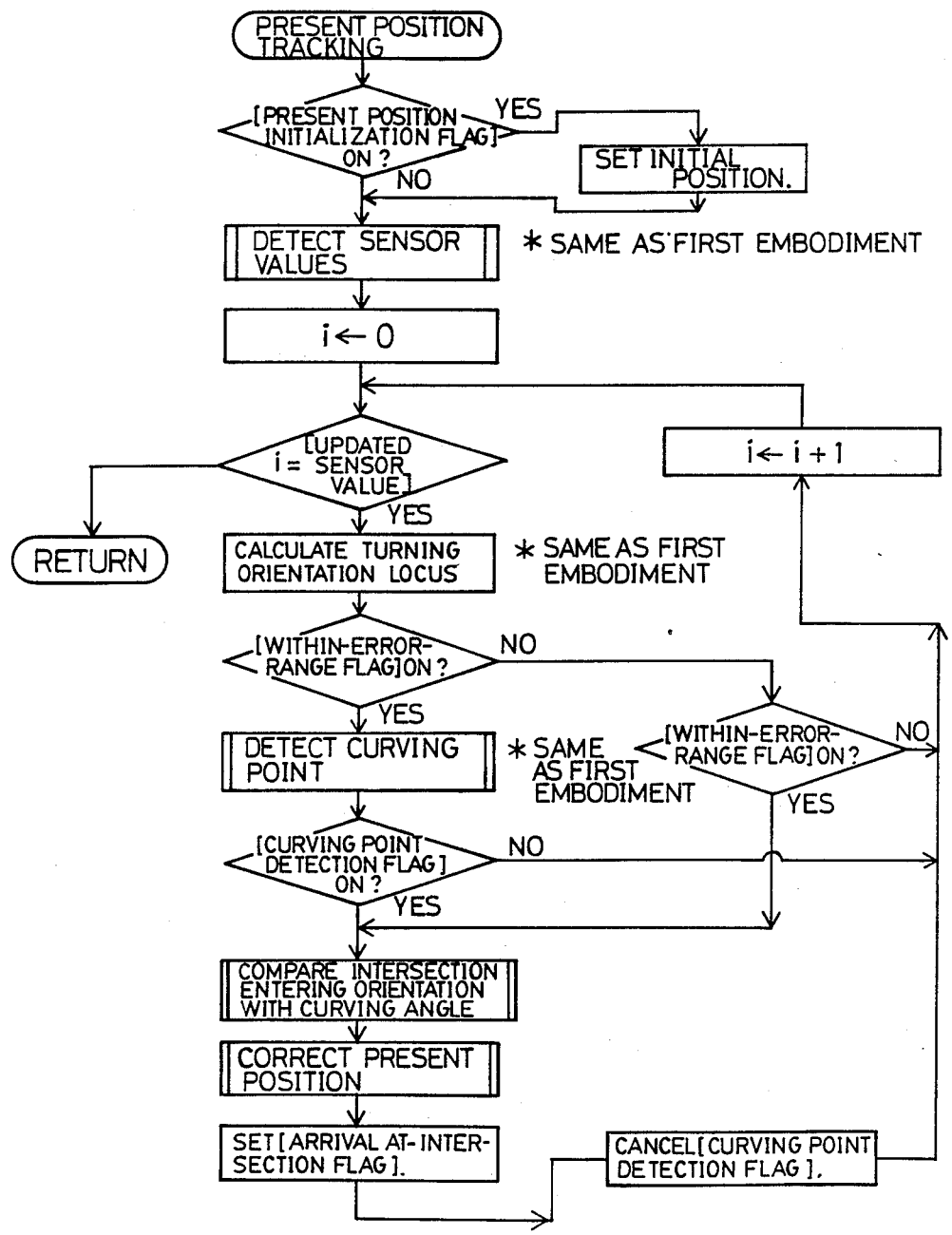
FIG. 23 is a flow chart of a processing routine for present position tacking in a navigation apparatus with a present position calculating system which represents a second embodiment of the present invention.

In the above-described embodiment, the present position is tracked with respect a road number and the remaining distance to the terminal intersection relating to this road number. In contrast, in a second embodiment as shown in FIG. 23, the present position is tracked by recognizing an intersection with a coordinate. Accordingly, part of processing of the second embodiment before the turning angle detecting step is the same as the above-described embodiment, but the second embodiment includes, as processing performed when the vehicle passes through an intersection, a step of comparing the intersection entering orientation with the turning angle and a present position correction step instead of the processing of the above-described embodiment from the road selection step to the distance error correction step.

Figure 24A:
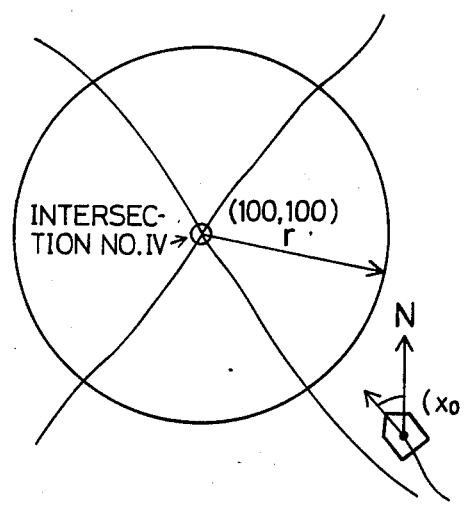
FIGS. 24(a)-24(c) are diagrams of turning point detection.
Figure 24B:
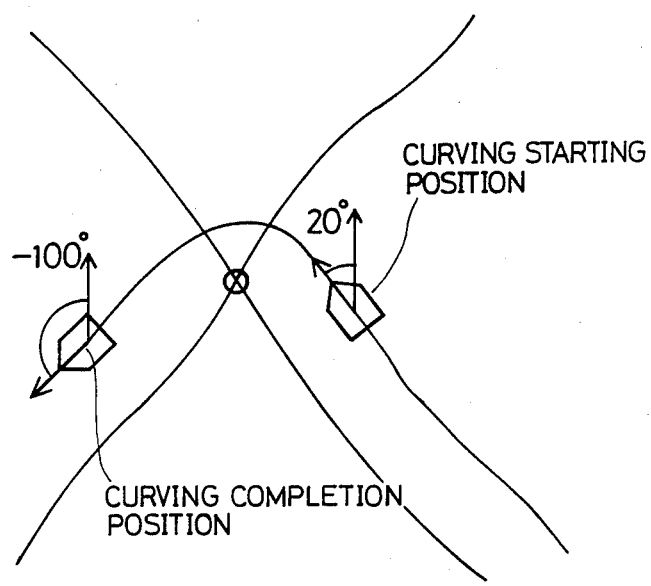
Figure 24C:
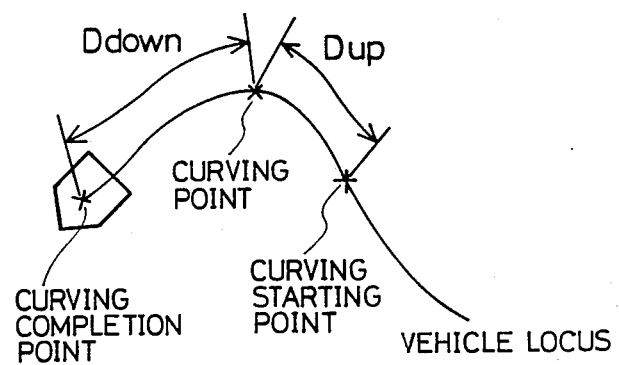

When, in an example shown in FIG. 24, the vehicle has advanced into the area of a circle having a certain radius and concentrical with an intersection, it is determined that the vehicle has entered an error range of the intersection. If a distance which defines the error range about the coordinate $(x_C, y_C)$ of the intersection is r, it is determined that the vehicle has entered the circle shown in FIG. 24 (a) when the vehicle has reached a position such that the coordinate $(x_O, y_O)$ of the present position (the position of the vehicle) satisfies a condition:

$$(x_C - x_O)^2 + (y_C - y_O)^2 < r^2$$

Then, the detection of turning is performed as shown in FIG. 24(b) so as to obtain a turning staring position and a turning completion position. If orientations at these positions are −20° and −100°, locus bending angle =

(turning completion position orientation) −

(turning start position orientation) = −100° − (−20°) = −80° is calculated, and the position of the turning point is detected, thereby setting $D_{up}$ = |turning point position − turning start position|

$D_{down}$ = |turning completion position − turning point position|

Figure 25A:
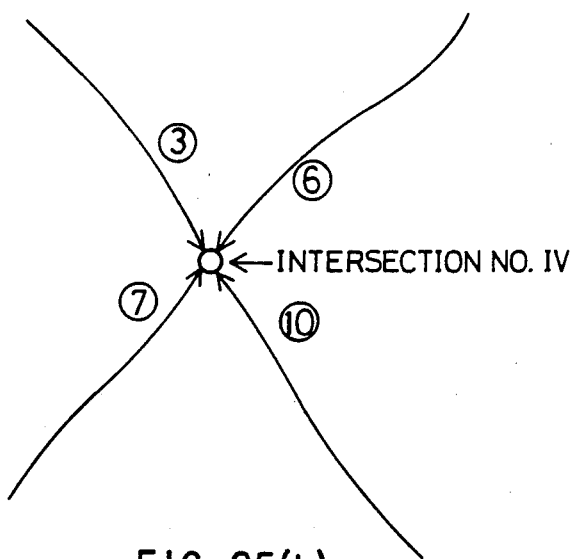
FIGS. 25(a)-25(c) are diagrams of processing relating to the comparison between the intersection entering orientation and the bending angle.
Figure 25B:
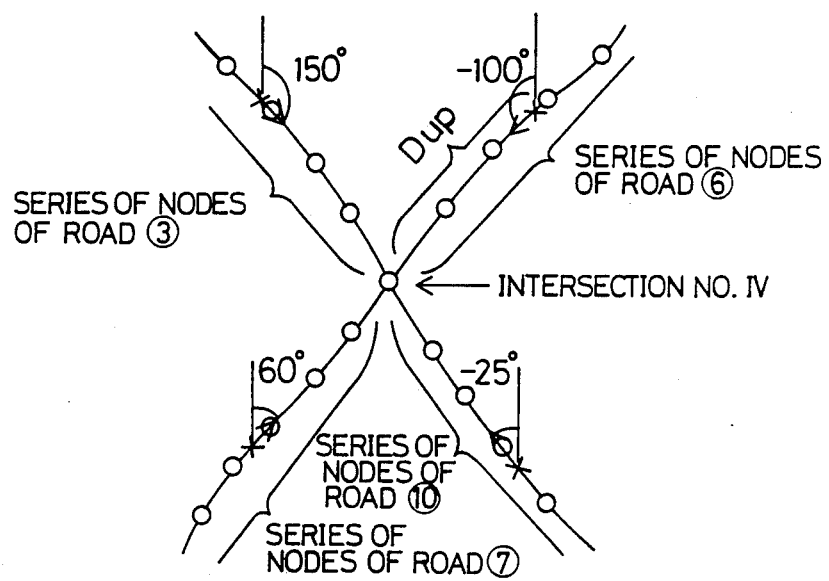

In the step of comparing the intersection entering orientation with the turning angle, roads leading into the intersection indicated by intersection number IV are found as leading-in roads from the intersection data or as roads having the same terminal end from the road data. The orientation at which the vehicle advances into the intersection along each of these roads is obtained as an orientation at a position located at the distance $D_{up}$ from the intersection position on the series of nodes of the road. If orientations thereby obtained are as listed below:

| Road number | Orientation of entrance to intersection IV |
|---|---|
| ③ | 150° |
| ⑥ | −100° |
| ⑦ | 60° |
| ⑩ | −25° | and as shown in FIG. 25(b), the road represented by the road number ⑩ is regarded as the coming-in road with respect to the example shown in FIG. 24(b) because it has an entering orientation most approximate to the turning start position (−20°).

After the coming-in load has been found, roads leading out of the intersection IV are read from he intersection data as roads having the same starting point from the road data. A change in the direction of traveling of the vehicle when the vehicle runs forward from the coming-in road ⑩ to each of the leading-out roads is then obtained. In this processing, the leading-out road is obtained from the difference between the turning start position orientation on the coming-in road and the orientation at the position located at the distance $D_{down}$ from the intersection position on the series of nodes on the leading-out road. Accordingly, the relationship between the coming-in road ⑩ and each of the leading-out roads ④, ⑤, ⑧, ⑨ is as follows.

| Road number | Orientation at turning completion position and bending angle |
|---|---|
| ④ | −30° − (−25°) = −5° |
| ⑤ | 80° − (−25°) = 105° |
| ⑧ | −120 − (−25°) = −95° |
| ⑨ | 155 − (−25°) = 180° |

In consequence, since the locus turning angle is −80° in the example shown in FIG. 24(b), the bending angle between the roads ⑩ and ⑧ closest to the above value is selected as the desired change in the traveling direction.

Figure 26:
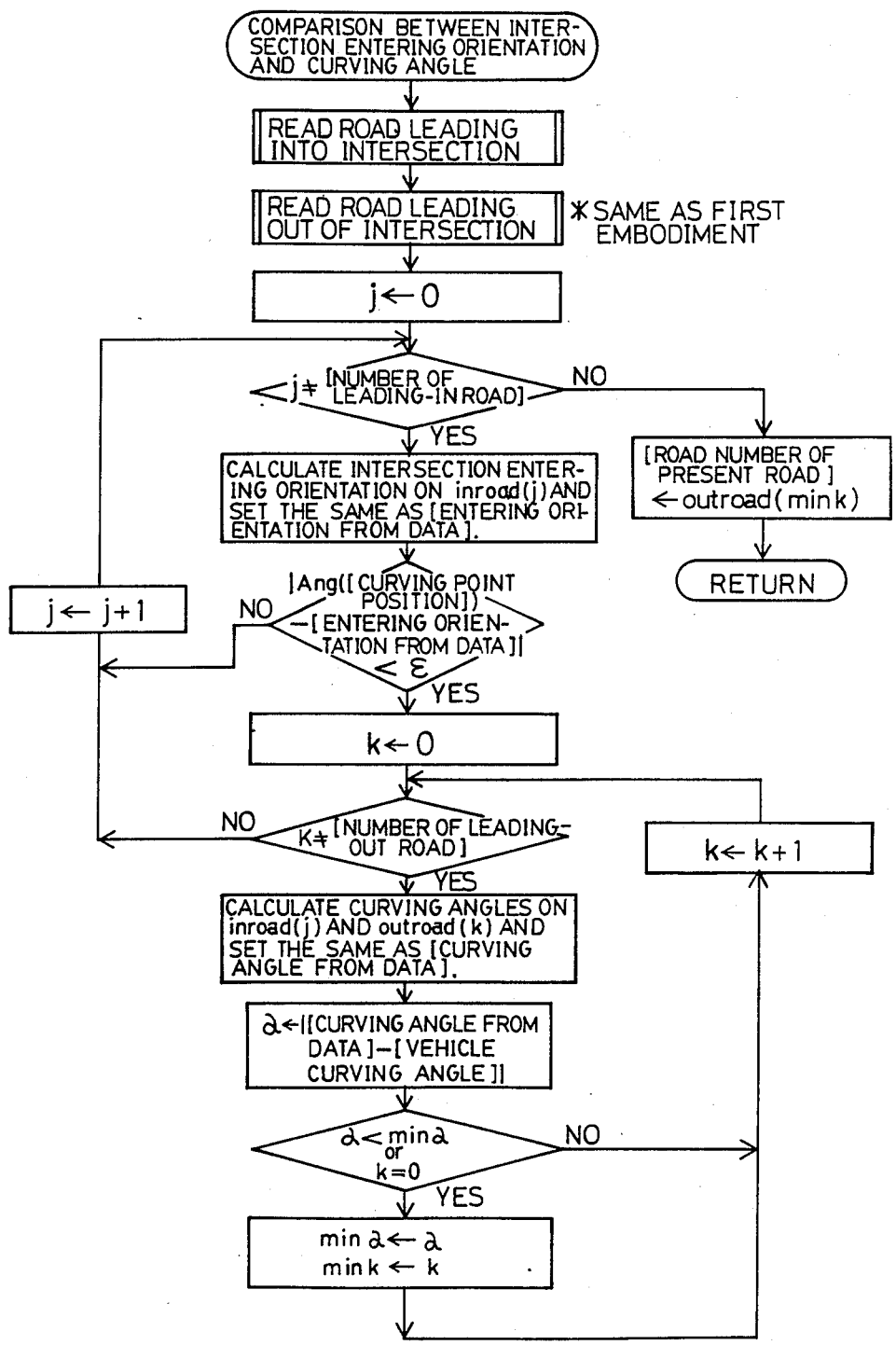
FIG. 26 is a flow chart of a processing routine corresponding to the processing of FIG. 25.

FIG. 26 shows a processing routine for the comparison between the intersection entering orientation and the turning angle. In the processing routine shown in FIG. 26, roads leading into an intersection are first read pout.

Figure 27:
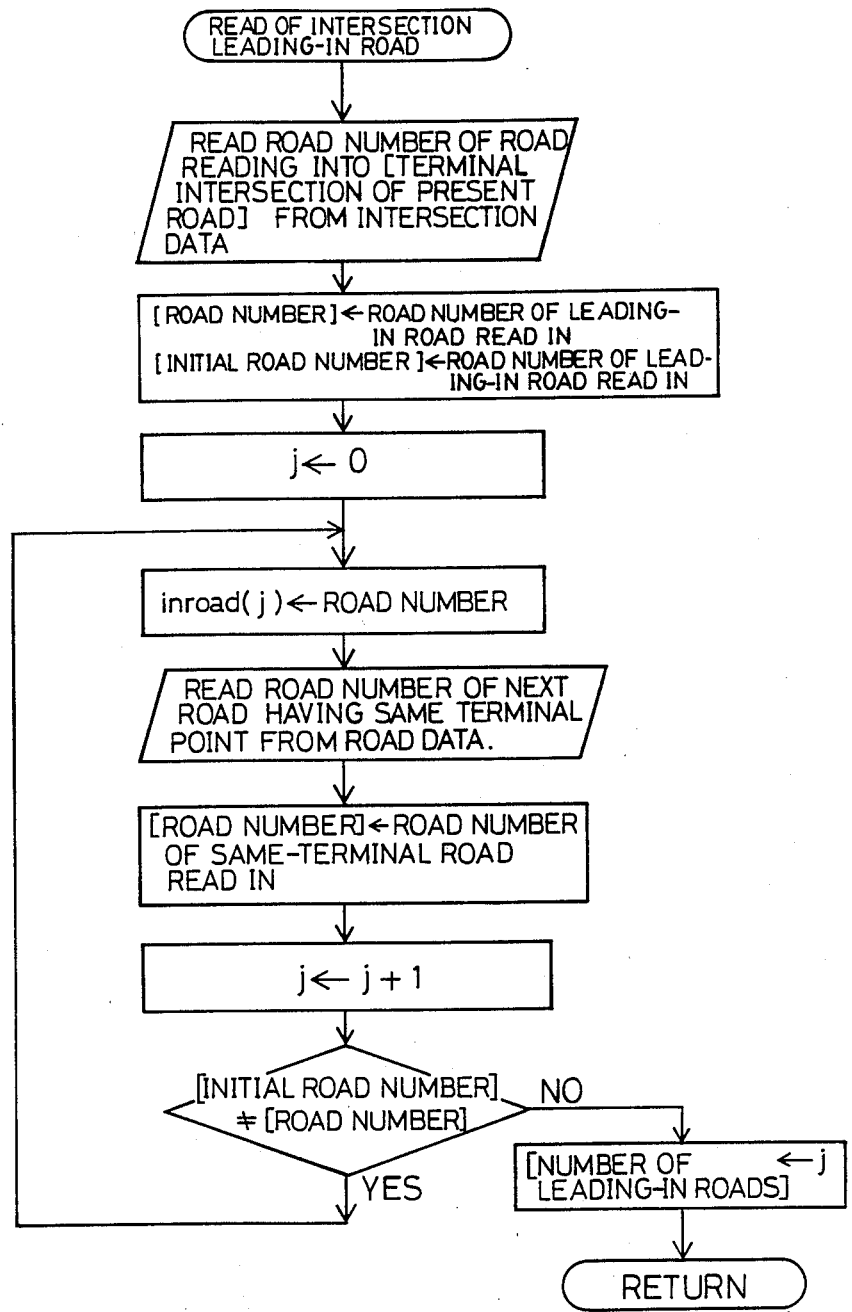
FIG. 27 is a flow chart of a processing routine for reading roads leading into an intersection.

In this processing, as shown in FIG. 27, the road number of one of the roads leading into the terminal intersection of the present road is read from the intersection data. This number is set as the "road number" and "initial road number", and loop counter j is set to 0. The rest of the leading-out road numbers are all read successively by reading the road data while incrementing loop counter j until the next number of a road having the same terminal point coincides with "initial rod number". The number of roads thereby found is set as "number of leading-in roads". That is, the processing is similar to the step of reading the road numbers of roads leading out of an intersection, which is described above with reference to FIG. 20.

Thereafter, the step of reading the road numbers of roads leading out of an intersection is performed in the same manner as the step shown in FIG. 20. Loop counter j is then set to 0.

Figure 25C:
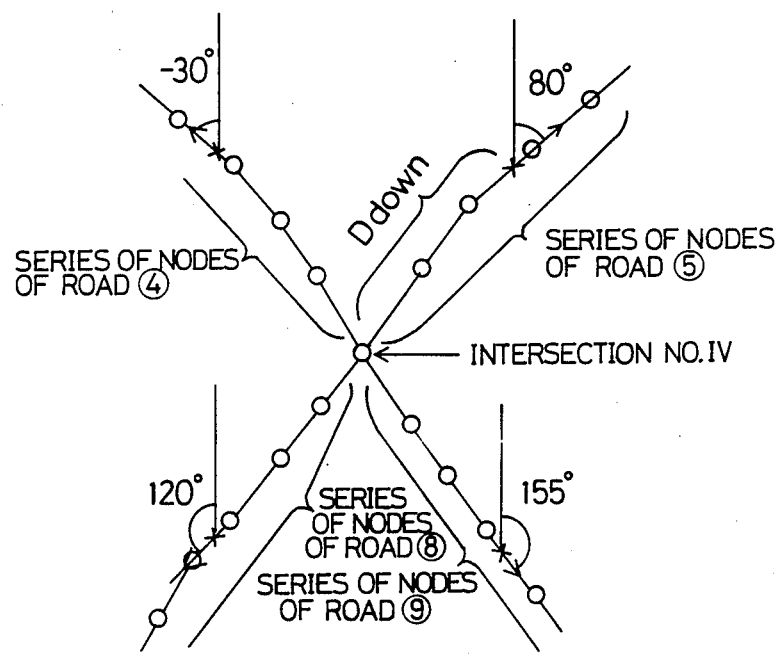

As loop counter j is incremented to the number of leading-in roads, coming-in road determination is performed with respect to the roads shown in FIG. 25(b). Loop counter k is then set to 0. As this loop counter is incremented, the bending angle is calculated, and traveling-direction road determination is performed with respect to the roads shown in FIG. 25(c). The road number indicating the road thereby obtained is set as the road number of the present road.

Figure 28A:
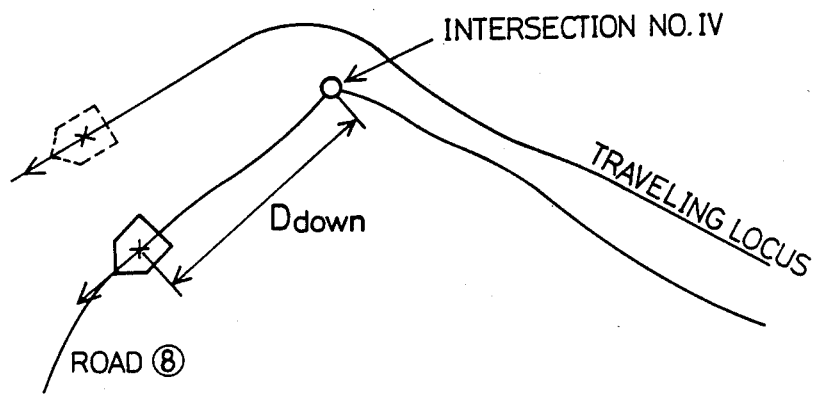
FIGS. 28 is are diagrams of present position correction.
Figure 28B:
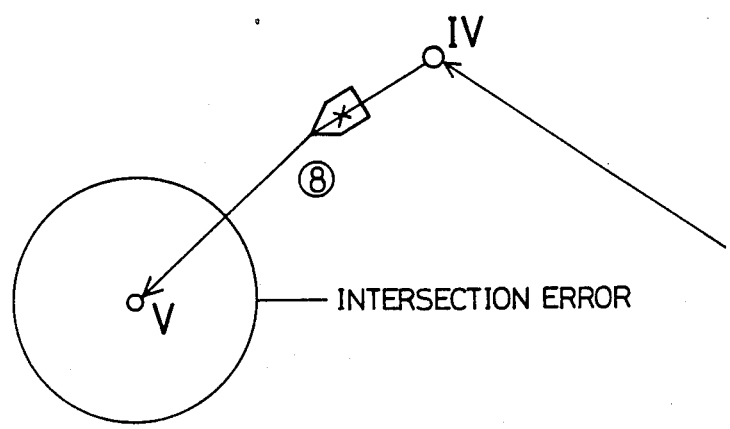

Present position correction is performed after the road number of the present position road has been obtained. In this processing, as shown in FIG. 28(a), the present position coordinate on the series of nodes of the road ⑧ is set, and the orientation at the present position is set to the orientation (−120°) at the turning completion position on the series of nodes. The terminal intersection V of the road having the road number ⑧ is read as the next intersection, as shown in FIG. 28(b), and the coordinate of this intersection is read from the intersection data. Thereafter, advancement of the vehicle into the error range of the intersection V is observed.

Figure 29:
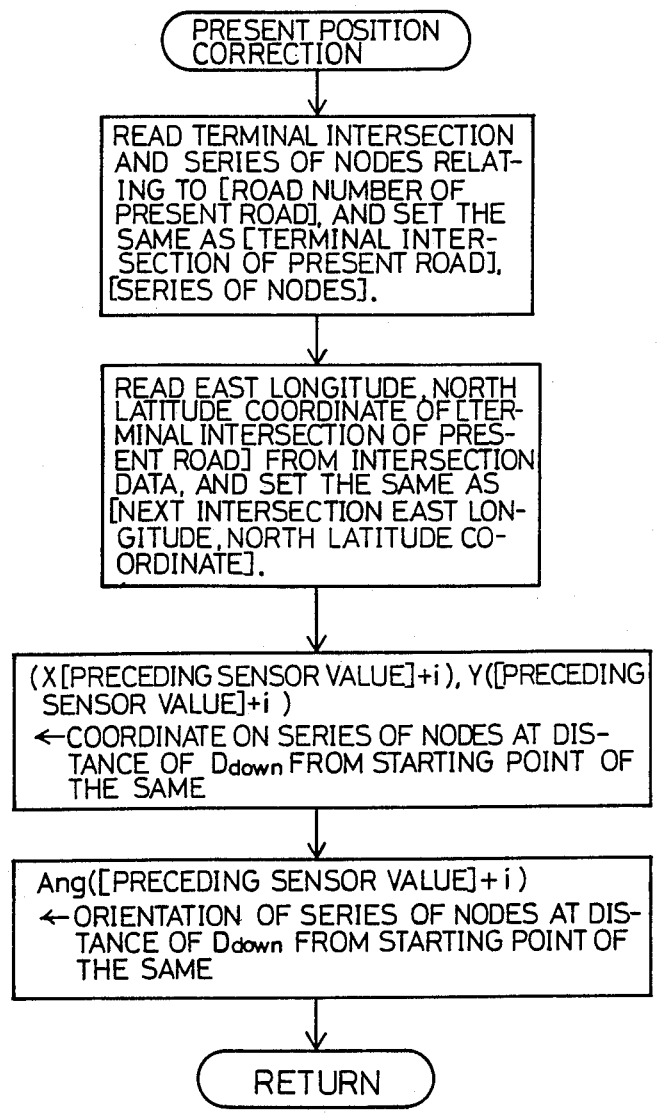
FIG. 29 is a flow chart of a processing routine corresponding to the processing of FIG. 28.

FIG. 29 shows a processing routine for this present position correction, In this processing routine as shown in FIG. 29, the terminal intersection and the series of nodes of the roads relating to the road number of the present road are first read from the road data, and are set as the "terminal intersection of present road" and the "series of nodes".

The coordinate corresponding to the east longitude and the north latitude of the "terminal intersection of present road" is read from the intersection data and is set as the "east longitude north latitude coordinate of next intersection".

The coordinate on the series of nodes at the distance $D_{down}$ from the starting point of "series of nodes" is set as a coordinate (X["preceding sensor value" +i], Y["preceding sensor value" +i]), while the orientation between nodes at the distance $D_{down}$ from the starting point of "series of nodes" is set as the orientation at the present position.

A still another embodiment of the present invention will be described below.

Figure 30:
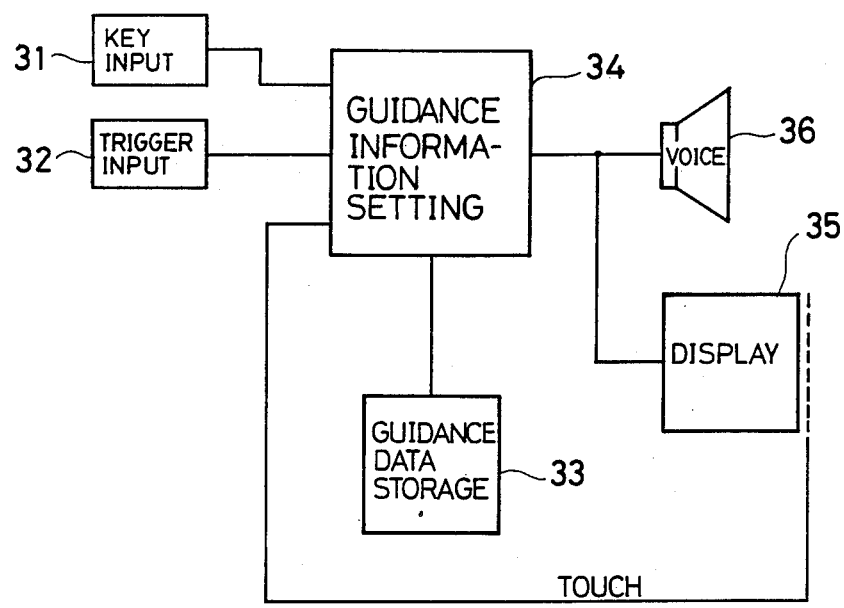
FIG. 30 is a diagram of an example of modification of the present invention.
Figure 31:
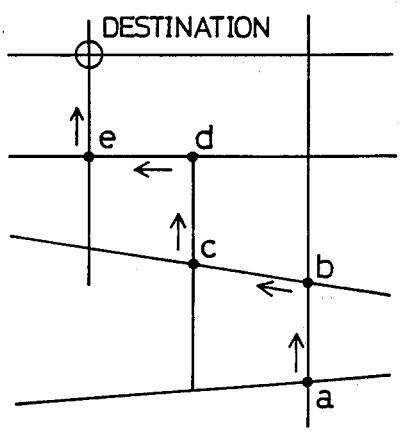
FIG. 31 is a diagram of an example of a course set by course searching.

Referring to FIG. 30, a key input means 31, trigger input means 32, a guidance data memory means 33, a guidance information setting means 34, a display outputting means 35, and a voice outputting means 36 are provided. The key input means 31 is constituted by a ten key cluster or function keys and is adapted to input code numbers representing predetermined points set as a destination point and a present position (guidance point). The trigger input means 32 is constituted by a touch-switch, a push-button switch or the like and is adapted to input a single trigger signal. The guidance data memory means 33 is a memory device such as a ROM for storing navigation data or information on places set as a destination point a present position, and so on. If a destination point is input or designated through the key input means 31, information for guidance to the destination point is set in the guidance information setting means 34 constituted by, for example, a CPU, in correspondence with respective points stored in the guidance data memory means 33. This information is stored in a memory such as a RAM. When a code number representing a present position is input through the key input means 31, the display output means 35 and the voice output means 36 output guidance information stored in the guidance information setting means 34. When a trigger signal is input through the trigger input means 32, the output means outputs guidance information on the next point on the course leading to the destination stored in the guidance information setting means 34 in accordance with the order of, for example, a, b, c ..., as shown in FIG. 31. For guidance at intersections, guidance information assigned to an intersection includes information on turning to the right or turning to the left at the next intersection for guidance to the destination. In the case where two intersections are located close to each other, it is of course possible that the guidance information includes information for designating a lane on which the driver should run the vehicle immediately before the vehicle turns at the first one of these intersections, as well as information on the direction in which the driver must steer the vehicle at this intersection, and that the guidance information further includes information on the direction in which the driver must steer the vehicle at the second intersection.

Figure 32:
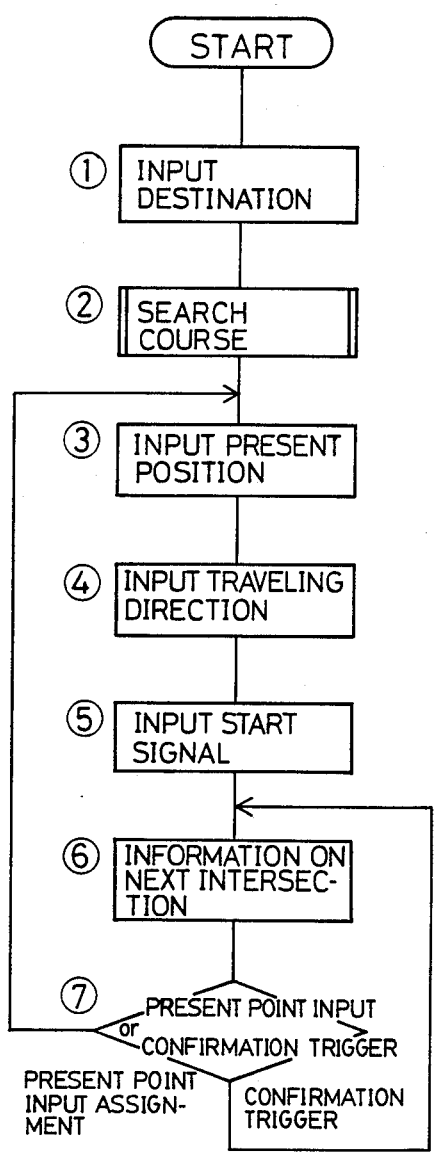
FIG. 32 is a flow chart of a schematic procedure of navigation processing.

Next, the flow of processing in a navigation apparatus having a means for inputting codes representing a destination point and a present point, an intersection confirmation trigger and a present position inputting button and adapted to perform guidance at intersections will be described below with reference to FIG. 32.

A destination code is first input by the driver (step ①), thereby setting a course search mode and information for guidance to the destination point with respect to all points except for the destination point (step ②). After course searching has been completed, present point inputting mode is selected. When a present point code is input (step ③), a traveling direction designated for this point is output (step ④). Then, an intersection confirmation trigger is input (starting input, step ⑤), information for guidance to the destination point at the next intersection is output (step ⑥). Whether an intersection confirmation trigger or a present point inputting button signal is input is observed (step ⑦). If an intersection confirmation trigger is input, the process returns to the processing of the step ⑥. If an present point inputting button signal is input, the process returns to the processing of the step ③. In short, in this system, a trigger is input each time an intersection is identified so long as the vehicle runs in accordance with guidance, or the present position inputting button is pressed by the driver if the driver finds that vehicle has deviated from the guidance course and traveled to a different intersection. Accordingly, items of information for guidance at intersections in the course leading to the destination point are successively output in response to trigger inputs, but if the present point inputting button is pressed, the present point inputting mode is selected.

Figure 33A:
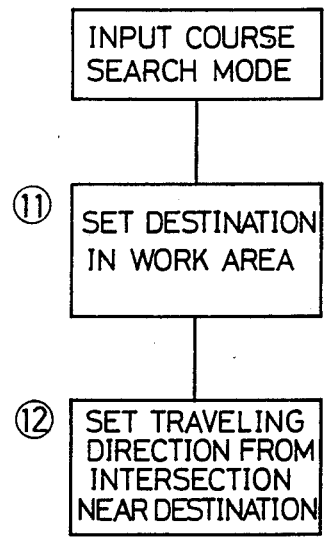
FIGS. 33(a)-33(b) are diagrams of course search processing.
Figure 33B:
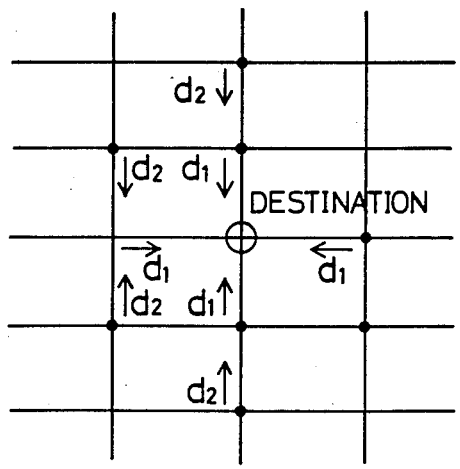

In the course search processing in step ②, after the course search mode has been selected, a destination point is set in a work area (step ⑪) and traveling directions are set successively from an intersection located nearest to the destination point (step ⑫), as shown in FIG. 33(a). As shown in FIG. 33(b), a traveling direction $d_1$ is set with respect to intersections adjacent to the destination point, and a traveling direction $d_2$ is set with respect to intersections located on the upstream side of the former. This course searching may be performed after step ③ in FIG. 32. In this case, course searching is performed each time the present position is input. With respect to trigger inputs, guidance information is output in accordance with a route which has been set as a result of course searching, and intersections treated as objects of guidance are therefore limited. Accordingly, it is possible that only information for guidance at least at these intersection are provided.

In the above example, guidance points are set to intersections. However, it is possible to set, as guidance points, landmarks such as bridges, elevated railroads and public facilities if the distance between intersections is large. Information for guidance to the destination point can include specific absolute information on that place shown as a map and a photograph on the display screen as well as voices. If there are some contents to be specially marked in information to be output, display design or display characters relating to them can be changed or different tones or intermittent sounds can be used. The apparatus can be designed not only to perform successive feeding of guidance points with triggers but also to enable the driver to see information for guidance several kilometers ahead the present position as desired.

A navigation apparatus having the above-described present position calculating system and the above-described updating system based on touch-operation can be adapted for processing, for example, a region consisting of monotonous loads such as single-lane roads and a region consisting of a complicated road system while being combined with each other.

As is apparent from the foregoing, in the system of the present invention, the direction of traveling to the destination point is set at each intersection, and the traveling direction at the next intersection is designated by the detection of the present position, thereby enabling the driver to freely select the course to his destination. Guidance information on the traveling direction can be output at any intersection. Intersection recognition processing is performed on the condition that the vehicle has entered the terminal intersection error range on the basis of road system data. The road in the traveling direction is thereby selected, and guidance at the terminal intersection of the selected road is output. It is therefore sufficient to repeat guidance at respective intersections in the course to the destination point. The system can be operated with flexibility from any intersection by using data with a simple data structure. Even if the driver has selected a road which deviates from the guidance course of the designated traveling direction, he can be guided at the terminal intersection of the selected road in a suitable direction of traveling to his destination, so long as the destination point is not changed. Therefore, even if the driver selects a road different from the optimum course at an intersection because of traffic snarl or for other reasons, he can be guided at the next intersection. Similarly, in the case where the driver is strayed out of the course, he can continue driving on the present road to an intersection and, at this intersection, immediately start present position tracking processing by inputting this intersection as the present position. Even if the road tracking means for recognizing intersections malfunctions, the driver can continue navigation control by inputting intersection recognition signals with a trigger input means constituted by a touch switch or a button switch.

What is claimed is:

1. A navigation apparatus having a present vehicle position locating system comprising:
   storage means for storing road system data including information about coordinates of intersections and roads between said intersections,
   means for detecting travel distance,
   means for detecting steering angle,
   output means for outputting guidance information to a driver of said vehicle, and
   navigation means for selecting a road of travel from a first intersection to a second intersection at said first intersection; determining a present position of a vehicle based on said detected steering angle and a remaining distance to said second intersection based upon length of said selected road and said detected travel distance; and outputting said guidance information corresponding to said present position to said output means.

2. A navigation apparatus according to claim 1, wherein said remaining distance is updated each time said detected travel distance equals a predetermined unit distance.

3. A navigation apparatus according to claim 1, wherein said navigation means determines an orientation and coordinates of said vehicle from said detected travel distance and said detected steering angle and determines said present position based on said orientation and coordinates.

4. A navigation apparatus according to claim 1, wherein said navigation means determines a turning angle of said vehicle and then said present position by a comparison of said turning angle and a position obtained from said road system data.

5. A navigation apparatus according to claim 1, wherein said navigation means includes turning point detecting means for detecting turning of said vehicle at said first intersection and distance error correcting means for correcting distance to said second intersection based upon said detected turning of said vehicle.

6. A navigation apparatus having a present vehicle position locating and tracking system comprising:
   storage means for storing road system data including information about roads and terminal intersections at ends of said roads,
   navigation means for setting a plurality of courses to an input destination point from said terminal intersections of said road system data, and outputting guidance information by an output means, said navigation means including:
   present position means for selecting a road to said destination point and determining a present position of a vehicle based on said selected road,
   turning point detection means for determining turning of said vehicle at any of said terminal intersections and said present position means determines said present position based on said turning of said vehicle, and
   guide means for providing said guidance information at each terminal intersection to said output means while traveling to said destination point.

7. A navigation apparatus according to claim 6, wherein said navigation means includes distance error correcting means for correcting distance to said destination point based upon said detected turning of said vehicle.

8. A navigation apparatus according to claim 7, wherein said navigation means initially sets a course to said destination point from each said terminal intersection of said road system data.

9. A navigation apparatus having a present vehicle position locating and tracking system comprising:
   storage means for storing road system data including information about terminal intersections and roads between said intersections,
   navigation means for setting a plurality of courses to an input destination point from said terminal intersections of said road system data, and providing guidance information along a selected one of said plurality of courses while tracking a present position of a vehicle, said navigation means including:
   guide means for outputting said guidance information at each said terminal intersection while traveling to said destination point,
   road selecting means for selecting a road in a direction to said destination point, and
   tracking means for tracking said present vehicle position on said selected road and detecting a terminal intersection of said selected road, and
   means for performing course guidance when said present position is within a predetermined area within said terminal intersection along said selected road and selecting another road to said destination point at said terminal intersection.

10. A navigation apparatus having a present vehicle position locating and tracking system comprising:
    storage means for storing road system data including information about terminal intersections and roads between said terminal intersections,
    input means for inputting a destination point,
    output means for outputting guidance information,
    navigation means connected to said storage means and said input means for, setting a course to said destination point at any of said terminal intersections from said road system data, selecting a road to said destination point, and providing guidance information to said output means, said navigation means including:
    guide means for providing said guidance information to said output means at each said terminal intersection while traveling to said destination point, tracking means for tracking said present vehicle position on said selected road and for detecting a terminal intersection of said selected road, and road recognition means for recognizing a road in a direction to said destination point from said terminal intersection of said selected road, and means for performing course guidance when said terminal intersection along said selected road is detected, selecting another road to said destination point at said terminal intersection, providing guidance information corresponding to a terminal intersection of said another selected road, and repeating said course guidance for each subsequent terminal intersection up to said destination point.

11. A navigation apparatus having a present vehicle position locating system comprising:

storage means for storing road system data including intersection data about roads having starting and terminal points respectively leaving and entering each intersection; road data including information about a starting intersection and a terminal intersection for each road and a node data about nodes along each road; and node series data having information corresponding to coordinates of points along said roads between intersections; and navigation means for setting a course leading to an input destination point at each said terminal intersection based on said road system data and selecting one of said set courses based on a present position of a vehicle, tracking said present position of said vehicle, and outputting by an output means guidance information corresponding to said selected course while tracking said present position.

* * * * *